(12) United States Patent
Satoh et al.

(10) Patent No.: US 8,411,027 B2
(45) Date of Patent: Apr. 2, 2013

(54) IMAGE DISPLAY APPARATUS

(75) Inventors: Masakazu Satoh, Sakurai (JP); Hajime Washio, Sakurai (JP); Sadahiko Yasukawa, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 432 days.

(21) Appl. No.: 12/654,397

(22) Filed: Dec. 18, 2009

(65) Prior Publication Data

US 2010/0103153 A1  Apr. 29, 2010

Related U.S. Application Data

(63) Continuation of application No. 11/058,301, filed on Feb. 16, 2005, now Pat. No. 7,649,521.

(30) Foreign Application Priority Data

Feb. 17, 2004  (JP) .................................. 2004-040511

(51) Int. Cl.
*G09G 3/36* (2006.01)
(52) U.S. Cl. ........................... 345/103; 345/87; 345/204
(58) Field of Classification Search .......... 345/204–215, 345/690–699, 87–104
See application file for complete search history.

(56) References Cited

U.S. PATENT DOCUMENTS

| | | | |
|---|---|---|---|
| 5,298,915 A | 3/1994 | Bassetti, Jr. ................... | 345/696 |
| 5,818,413 A | 10/1998 | Hayashi et al. | |
| 6,181,312 B1 | 1/2001 | Sekine ............................. | 345/98 |
| 6,184,853 B1 * | 2/2001 | Hebiguchi et al. .............. | 345/88 |
| 6,229,530 B1 * | 5/2001 | Ushiki ........................... | 345/204 |
| 6,424,328 B1 * | 7/2002 | Ino et al. ......................... | 345/87 |
| 6,630,920 B1 | 10/2003 | Maekawa et al. | |
| 2001/0050688 A1 | 12/2001 | Fujiyoshi et al. | |
| 2002/0033809 A1 | 3/2002 | Nakajima | |
| 2003/0006978 A1 | 1/2003 | Fujiyoshi | |
| 2004/0066361 A1 | 4/2004 | Ishii et al. | |
| 2005/0184971 A1 | 8/2005 | Ogino et al. | |

FOREIGN PATENT DOCUMENTS

| | | |
|---|---|---|
| EP | 1 069 457 A1 | 1/2001 |
| JP | 02-003008 A | 1/1990 |
| JP | 04-322216 A | 11/1992 |

(Continued)

OTHER PUBLICATIONS

Notice of Allowance which issued Aug. 27, 2009 in the parent U.S. Appl. No. 11/058,301.

(Continued)

*Primary Examiner* — Kevin M Nguyen
*Assistant Examiner* — Cory Almeida
(74) *Attorney, Agent, or Firm* — Harness, Dickey & Pierce, P.L.C.

(57) ABSTRACT

A plurality of scanning signal lines GLn divided into groups, and each group is made up of three scanning signal lines GLnR, GLnG and GLnB, and a plurality of pixels are divided into pixel blocks, and each pixel block is made up of three pixels PR (n, m), PG (n, m) and PB (n, m) respectively connected to the scanning signal lines GLnR, GLnG and GLnB. These pixels PR (n, m), PG (n, m) and PB (n, m) are connected to a common data signal line SLm. To the scanning signal lines GLnR, GLnG, GLnB, scanning pulses are sequentially outputted to the scanning signal lines GLnR, GLnG and GLnB from shift registers SRnR, SRnG and SRnB, and video signals for R, G and B are outputted to the data signal line SLm from a driver IC by time division.

6 Claims, 13 Drawing Sheets

FOREIGN PATENT DOCUMENTS

| | | |
|---|---|---|
| JP | 06-138851 A | 5/1994 |
| JP | 08-234237 A | 9/1996 |
| JP | 8-234703 | 9/1996 |
| JP | 8-305322 | 11/1996 |
| JP | 11-45072 A | 2/1999 |
| JP | 11-296129 | 10/1999 |
| JP | 2000-227784 A | 8/2000 |
| JP | 2000-338918 A | 12/2000 |
| JP | 2002-023135 A | 1/2002 |
| JP | 2002-032051 | 1/2002 |
| JP | 2002-215105 | 7/2002 |
| JP | 2003-22057 A | 1/2003 |
| KR | 0292400 B1 | 3/2001 |

OTHER PUBLICATIONS

Japanese Office Action and English translation thereof.
U.S. Office Action dated Jan. 24, 2008 Corresponding to U.S. Appl. No. 11/058,301.
U.S. Office Action dated Jun. 27, 2008 Corresponding to U.S. Appl. No. 11/058,301.
U.S. Office Action dated Dec. 12, 2008 Corresponding to U.S. Appl. No. 11/058,301.
U.S. Office Action dated Jun. 8, 2009 Corresponding to U.S. Appl. No. 11/058,301.
Japanese Office Action and English translation thereof dated Aug. 21, 2007.

* cited by examiner

IMAGE DISPLAY APPARATUS

CROSS-REFERENCE TO RELATED APPLICATION(S)

This nonprovisional application is a continuation application of U.S. application Ser. No. 11/058,301, filed on Feb. 16, 2005, now U.S. Pat. No. 7,649,521 which claims priority under 35 U.S.C. §119(a) on Patent Application No. 2004-40511 filed in Japan on Feb. 17, 2004, the entire contents of each of which are hereby incorporated by reference.

FIELD OF THE INVENTION

The present invention relates to a display apparatus which performs a display by supplying externally supplied video signals to a display section by time division.

BACKGROUND OF THE INVENTION

For conventional active matrix liquid crystal display apparatuses provided with external driver ICs, in order to meet a demand for higher precision, it is necessary to increase a number of connection terminals and to provide these connection terminals at narrower pitches. The foregoing conventional active matrix liquid crystal display apparatuses therefore have a problem in that the mounting process becomes complicated. In response, the time division driving method has been proposed. In the time division driving method, a plurality of signal lines are divided into blocks, and signals to be applied to the signal lines in each block are outputted from a driving circuit in time series, and time division switches are provided for the signal lines in each block, which divide the signals outputted from the driver IC in time series into time segments to be sequentially applied to the signal lines. With this time division driving method, it is possible to reduce the number of connection terminals.

A typical depiction of the structure of an active matrix liquid crystal display apparatus adopting the time division driving method is shown in FIG. 11. On the active matrix substrate 101, formed are a plurality of scanning signal lines and a plurality of data signal lines in a form of a matrix, and a plurality of pixels provided at respective interactions between the data signal lines and the scanning signal lines to form a liquid crystal display panel. These pixels are divided into blocks, each block corresponding to a combination of video signals for R, G and B to be supplied to respective pixels by time division. Namely, a pixel PR (n, m) for R, a pixel PG (n, m) for G and a pixel PB(n, m) for B which are successively aligned in a direction of a scanning signal line constitute a pixel block. Each pixel has a pixel capacitance CL and a switching element SW.

The respective ends on one side of the scanning signal lines GL1, GL2, . . . and GLn are connected to the output terminals in the corresponding lines of the scanning signal line driving circuit (not shown). The scanning signal line driving circuit carries out a scanning operation in a vertical direction by selecting pixels line by line by sequentially supplying scanning pulses to the scanning signal lines GL1, GL2, . . . , GLn. Further, a plurality of driver ICs (not shown) are provided for supplying a predetermined voltage according to the image data to data signal lines SL1R, SL1G, SL1B, . . . , SLmR, SLmG, SLmB, . . . as an external circuit of the liquid crystal display panel.

To realize the time division driving, a plurality of signal lines are divided into signal line groups, and each driver IC is arranged so as to output signals to be applied to a plurality of signal lines in the signal line group in time series. To realize the foregoing structure, between the output signal lines SL1, SL2, SL3, . . . , SLm of the driver IC and the data signal lines SL1R, SL1G, SL1B, . . . , SLmR, SLmG, SLmB, . . . provided are analog switches (time division switches) of the CMOS, NMOS or PMOS structure.

FIG. 12 shows the connection state of the time division switches when adopting the time division driving method in which a transmission time is divided into three time segments correspondingly to R, G and B. In this time division driving method, from respective output terminals of the driver ICs, signal voltages for three pixels for R, G and B are outputted sequentially in time series via the output signal lines SL1, SL2, SL3, . . . , SLm. Specifically, as shown in the timing chart of FIG. 13, as output signals from the driver IC, video signals for DATAmR, DATAmG and DATAmB for respective pixels R, G and B are outputted to the output signal line SLm. As shown in FIGS. 11 and 12, between the output signal line SLm and three data signal lines SLmR, SLmG and SLmB, provided are time division switches ASWmR, ASWmG and ASWmB. The time division switches are provided in the number of three for each output signal line (here, one signal line on the side of the driver IC connected to SLmR, SLmG and SLmB is called the output signal line SLm) corresponding to the number of time segments (three) in the time division method.

The concrete structure of a set of time division switches ASWmR, ASWmG and ASWmB will be explained in reference to the circuit diagram of FIG. 12.

The respective input terminals of these three time division switches ASWmR, ASWmG and ASWmB are connected in common to the output signal line SLm. As a result, the signal potentials outputted in time series from the driver IC are applied to respective input terminals of these three time division switches ASWmR, ASWmG and ASWmB via the output signal line SLm. On the other hand, output terminals of these time division switches ASWmR, ASWmG and ASWmB are connected to respective ends on one side of the data signal lines SLmR, SLmG, SLmB.

The three control signal lines Rct1, Gct1, Bct1 are provided for each time division switch along the scanning signal lines GL1, GL2, . . . and GLn, wherein a control input terminal of the time division switch ASWmR is connected to the control line Rct1, the control input terminal of the time division switch ASWmG is connected to the control line Gct1, and the control input terminal of the time-division switch ASWmB is connected to the control line Bct1.

To these three control signal lines Rct1, Gct1, and Bct1, supplied are control signals Rct1, Gct1, and Bct1 (for convenience in explanations, same reference symbols are used as the control signals) for selecting three time division switches in each group. These three control signal lines Rct1, Gct1, and Bct1 are signals for sequentially setting ON the three time division switches in each group in sync with signal potentials in time series outputted from the driver IC.

These time division switches ASWmR, ASWmG and ASWmB are sequentially set ON by receiving scanning signal line selection signals GL1, GL2 and GL3, . . . , GLn (for convenience in explanations, same reference symbols are used as the scanning signal lines) as supplied externally, and the signals as outputted in time series to the output signal lines SL1, SL2, SL3, SLm, . . . from the driver IC are supplied to the corresponding signal line by time division in which one horizontal scanning period is divided into three time segments.

Japanese Unexamined Patent Publication No. 338438/1999 (Tokukaihei 11-338438, published on Dec. 10, 1999), Japanese Unexamined Patent Publication No. 234237/1996

(Tokukaihei 8-234237, published on Sep. 13, 1996), Japanese Unexamined Patent Publication No. 138851/1994 (Tokukaihei 6-138851, published on May 20, 1994), and Japanese Unexamined Patent Publication No. 322216/1992 (Tokukaihei 4-322216, published on Nov. 12, 1992) disclose the generally used SSD (Source Shared Driving Method).

In FIG. 12, when signal potentials are inputted to the data signal lines SLmR, SLmG, SLmB from the driver IC, the data signal line, corresponding to the time division switch ASWmR in the OFF state, becomes in the high impedance state, and the data signal line is therefore liable to be affected by externally supplied potentials, for example, and the potential of the signal line is therefore liable to be fluctuated. As illustrated in FIG. 12, for example, the data signal line SLmR includes the capacitive coupling component between other data signal lines SLmG and SLm-1B. As shown in the timing chart of FIG. 13, when the time-division switch ASWmR is switched OFF at time Tre when the video signal DATAmR is supplied, the data signal line SLmR is set in the floating state, and when the time division switch ASWmG is set in the ON state at time Tgs, the data signal line SLmR is subjected to fluctuations in potential as being affected by the fluctuations in potential of the data signal line SLmG. Similarly, when the time-division switch ASWmG is switched OFF at time Tge when the video signal DATAmG is supplied, the data signal line SLmG is set in the floating state, and when the time division switch ASWmB is set in the ON state at time Tbs, the data signal line SLmG is subjected to fluctuations in potential as being affected by the fluctuations in potential of the data signal line SLmB.

As described, when the video signals are supplied to the data signal line by time division, only the data signal line SLmB charged by the video signal DATAmB last is not affected by the fluctuations in potential by the capacitive coupling, and upon completing the function of the scanning signal GLn which controls the charge in a pixel, a display corresponding to the potential at that time is made in the display section. Here, fluctuations in potential ΔV due to the capacitive coupling are accumulated in the order of the switching signals Ron→Gon→Bon, which results in that the respective potentials VSLmR, VSLmG and VSLmB of the data signal lines SLmR, SLmG and SLmB become VSLmR>VSLmG>VSLmB when a display is made in gray color of the intermediate tone by setting the potentials of the video signals DATAmR, DATAmG and DATAmB to be equal. Therefore, when the normally white mode is selected for the liquid crystal display mode, a display becomes in dark blue gray.

SUMMARY OF THE INVENTION

The present invention is achieved by finding a way to solve the foregoing problem associated with the conventional structure, and it is therefore an object of the present invention to realize an image display apparatus wherein image data is divided into blocks, each being made up of a combination of a plurality of video signals for R, G and B, and respective video signals for each block are supplied to pixels by time division, which permits a video signal written in a prescribed pixel from being affected by fluctuations in potential due to a supply of another video signal into adjacent pixel.

In order to achieve the foregoing object, an image display apparatus is characterized by including:

a plurality of scanning signal lines and a plurality of data signal lines which are arranged in a matrix form;

a plurality of pixels provided correspondingly to respective intersections between the plurality of scanning signal lines and the plurality of data signal lines, wherein the plurality of pixels are divided into pixel blocks, each pixel block being made up of pixels corresponding to a set of video signals to be supplied thereto by time-division; and a scanning signal line driving circuit which sequentially outputs a scanning signal for selecting a pixel, to each of the plurality of scanning signal lines, wherein a display is performed by a) outputting by time-division the video signals to be supplied to the pixels in each pixel block, to a data signal line, and b) writing a video signal in each pixel as selected by the scanning signal line driving circuit via a corresponding scanning signal line; and the pixels which constitute one pixel block are sequentially selected by time division via corresponding different scanning signal lines, and the video signal is then written in each pixel by a common data signal line.

According to the foregoing structure, respective pixels in the pixel block are sequentially selected by time division via corresponding different scanning signal lines. Then, video signals are written in respective pixels by time division from a data signal line used in common among the pixels in the pixel block.

With this structure, it is not necessary to write video signals in the pixels in the pixel block via respective data signal lines, and it is therefore possible to omit time division switches for supplying the video signals by time division. As a result, it is possible to prevent the problem associated with the conventional structure, i.e., the operation of writing the video signal into the adjacent data signal line is carried out in the state where an output of the time-division switch becomes high impedance, and the data signal line is in the floating state. Therefore, the potential of the video signal already written does not fluctuate as being affected by the potential fluctuations of the adjacent data signal line resulting from the supply of another video signal into an adjacent pixel in the pixel block. Incidentally, as the scanning signal lines for selecting respective pixels which constitute one pixel block are mutually different, when writing a video signal in one pixel, other pixels to which other video signals are to be written can be set in the non-selection state.

As a result, the video signal written in one pixel can be prevented from being affected by potential fluctuations of the adjacent scanning signal lines, data signal lines and pixels.

As a result, it is possible to realize an image display apparatus wherein image data is divided into blocks, each being made up of a combination of a plurality of video signals, and respective video signals for each block are supplied to pixels by time division, which permits a video signal written in a prescribed pixel from being affected by fluctuations in potential due to a supply of another video signal to an adjacent pixel.

With the foregoing structure, it is not necessary to provide a data signal line for each of the pixels in the pixel block, and it is therefore possible to reduce the number of connection terminals.

The image display apparatus of the present invention of the foregoing structure may be arranged such that:

the scanning signal line driving circuit includes a plurality of shift registers provided for respective scanning signal lines, which are connected in series; and respective output signals of the plurality of shift registers are used as the scanning signals.

According to the foregoing structure, only by increasing the number of stages of shift registers in the scanning signal line driving circuit, by a number of time segments for supplying video signals to the pixels in the pixel block from that of the conventional shift registers, it is possible to output scanning signals by time division without such problem that the video signal written in the pixel is affected by pixel fluctuations due to a supply of another video signal into an adjacent pixel.

The image display apparatus having the foregoing structure may be further arranged such that:

the scanning signal line driving circuit includes shift register groups provided in a number of k, k indicating a number of time segments in a transmission time of the time division for supplying the video signals to the pixels in each pixel block, wherein, of all the shift registers provided for respective scanning signal lines, those which correspond to the scanning signal lines connected to the pixels to which the video signals are supplied in the i-th order ($1 \leqq i \leqq k$) are mutually connected in series; and a scanning signal to be outputted to each of the scanning signal lines connected to the pixels in the i-th line is generated by performing a logical operation to obtain a logical AND of a) an output signal from one of the shift registers in the i-th shift register group, b) an inversed signal of the output signal from the shift register in the i+1-th shift register group (the first shift register group in the case of i=k), and c) a scanning signal generation control signal supplied by a separately provided signal supply line.

According to the foregoing structure wherein the shift register groups are provided in the number of k, the number of stages of the shift registers in each shift register group can be reduced to 1/k as compared to the case of connecting all the shift registers in series. Furthermore, when writing video signals in respective pixels in the block by time division, a scanning signal to be outputted to each of the scanning signal lines connected to the pixels in the i-th shift register group is generated by performing a logical operation to obtain a logical AND of a) an output signal from one of the shift registers in the i-th shift register group, b) an inversed signal of the output signal from the shift register in the i+1-th shift register group (the first shift register group in the case of i=k), and c) a scanning signal generation control signal supplied by a separately provided signal supply line, to compensate for a reduced number of shift registers in one shift register group.

As a result, an operation frequency of the scanning signal line driving circuit can be reduced to 1/k, that is 1 over the number of time segments, as compared to the case of connecting all the shift registers in series, and it is therefore possible to reduce an amount of power consumption.

The image display apparatus having the foregoing structure may be further arranged such that:

the scanning signal line driving circuit includes a plurality of shift registers connected in series, each shift register being provided correspondingly to a group of the scanning signal lines connected to the pixels in each pixel block, the image display apparatus, further comprising:

a time-division circuit which generates from the output signal of the corresponding shift register, the scanning signal to be outputted to each of the scanning signal lines connected to the pixels in each pixel block.

According to the foregoing structure wherein a shift register is provided correspondingly to a group of the scanning signal lines connected to the pixels in each pixel block, the number of stages of the shift registers in each shift register group can be reduced to 1/k, that is 1 over the number of time segments, as compared to the case of connecting all the shift registers in series. Furthermore, when writing video signals in pixels in the block by time division, a scanning signal to be outputted to each of the scanning signal lines connected to the pixels in the block is generated from the output signal of the corresponding shift register, to compensate for a reduced number of shift registers.

With the above structure, since the number of stages of the shift registers of the scanning signal line driving circuit can be reduced, it is possible to reduce an area occupied by the circuit, and the operation frequency of the scanning signal line driving circuit can be reduced to 1/k that is 1 over the number of time segments, as compared to the case of connecting all the shift registers in series, and it is therefore possible to reduce an amount of power consumption.

The image display apparatus having the foregoing structure of the present invention may be further arranged such that:

the time division circuit includes a) a plurality of analog switches wherein each analog switch is provided for connecting an output signal line of the shift register and each of the scanning signal lines for one pixel block, and b) potential fixing means for fixing a potential of the scanning signal line connected thereto when the analog switch is in the non-conductive state.

According to the foregoing structure, an output signal line of the shift register and each scanning signal line can be conducted by time division by an analog switch. Further, by the potential fixing means, the potential of the scanning signal line connected the analog switch is fixed when the analog switch is in the non-conductive state. As a result, it is possible to prevent the problem of carrying out a writing operation of a video signal in the floating state of the scanning signal line.

As a result, video signals can be surely written in respective pixels in the pixel block by time division.

The image display apparatus having the foregoing structure of the present invention may be further arranged such that:

the time division circuit includes a two-input AND circuit provided for each scanning signal line, wherein a) an output of the shift register is inputted to one of the input terminals of the two-input AND circuit, b) a scanning signal generation control signal is inputted to the other input terminal of the two-input AND circuit from a separately provided signal supply line, and c) an output terminal of the two-input AND circuit is connected to the scanning signal line.

According to the foregoing structure, by performing a logical operation by the AND circuit to obtain a logical AND of the output signal of the shift register and the scanning signal generation control signal, it is possible to supply respective video signals by time division to the scanning signal lines respectively connected to the signal output line of the shift register.

As a result, video signals can be surely written in respective pixels in the pixel block by time division.

Furthermore, the potential of the scanning signal line is defined by the potential of the output terminal of the AND circuit, and it is therefore possible to omit the means for fixing the potential of the scanning signal line when the scanning signal line is set in the non-selection state.

The image display apparatus having the foregoing structure may be further arranged such that:

the time division circuit includes a two-input NOR circuit provided for each scanning signal line, wherein a) an inversed signal of an output of the shift register is inputted to one of the input terminals of the two-input NOR circuit, b) a scanning signal generation control signal is inputted to the other input terminal of the two-input NOR circuit from a separately provided signal supply line, and c) an output terminal of the two-input NOR circuit is connected to the scanning signal line.

According to the foregoing structure, by performing a logical operation by the NOR circuit to obtain a logical NOR of an inversed signal of the output signal of the shift register and the scanning signal generation control signal, it is possible to supply respective video signals by time division to the scanning signal lines respectively connected to the signal output line of the shift register.

As a result, video signals can be surely written in respective pixels in the pixel block by time division.

Furthermore, the potential of the scanning signal line is defined by the potential of the output terminal of the NOR circuit, and it is therefore possible to omit the means for fixing the potential of the scanning signal line when the scanning signal line is set in the non-selection state.

In order to achieve the foregoing object, another image display apparatus is characterized by including:

a plurality of scanning signal lines and a plurality of data signal lines which are arranged in a matrix form;

a plurality of pixels provided correspondingly to respective intersections between the plurality of scanning signal lines and the plurality of data signal lines, wherein the plurality of pixels are divided into pixel blocks, each pixel block being made up of three pixels corresponding to a set of video signals for R, G and B to be supplied thereto by time-division; and a scanning signal line driving circuit which sequentially outputs a scanning signal for selecting a pixel, to each of the plurality of scanning signal lines, wherein a display is performed by a) outputting by time-division the video signals to be supplied to the pixels in each pixel block, to a data signal line, and b) writing a video signal in each pixel as selected by the scanning signal line driving circuit via a corresponding scanning signal line; and the pixels which constitute one pixel block are sequentially selected by time division via mutually different scanning signal lines, and the video signal is then written in each pixel by a common data signal line.

According to the foregoing structure, respective pixels for R, G and B in the pixel block are sequentially selected by the time division method in which a transmission time is divided into three time segments, via different scanning signal lines. Then, video signals are written in the pixels by time division from a data signal line used in common among the pixels in the pixel block.

With this structure, it is not necessary to write video signals in the pixels in the pixel block via respective data signal lines, and it is therefore possible to omit a time division switch for supplying the video signals by time division. As a result, it is possible to prevent the problem associated with the conventional structure, i.e., the operation of writing the video signal into the adjacent data signal line is carried out in the state where an output of the time-division switch becomes high impedance, and the data signal line is in the floating state. Therefore, the potential of the video signal already written does not fluctuate by the potential fluctuations of the adjacent data signal lines resulting from the supply of other video signals in adjacent pixels in the pixel block. Incidentally, as the scanning signal lines for selecting respective pixels which constitute one pixel block are mutually different, when writing a video signal in one pixel, other pixels to which other video signals are to be written can be set in the non-selection state.

As a result, the video signal written in one pixel can be prevented from being affected by potential fluctuations of the adjacent scanning signal lines, data signal lines and pixels.

As a result, it is possible to realize an image display apparatus wherein image data is divided into blocks, each being made up of a combination of a plurality of video signals for R, G and B, and respective video signals for each block are supplied to pixels by time division, which permits a video signal written in a prescribed pixel from being affected by fluctuations in potential due to a supply of another video signal to an adjacent pixel.

Incidentally, it is not necessary to provide a data signal line for each of the pixels for R, G and B in the pixel block, it is possible to reduce the number of connection terminals.

The image display apparatus having the foregoing structure may be further arranged such that:

the scanning signal line driving circuit includes a plurality of shift registers provided for respective scanning signal lines, which are connected in series; and respective output signals of the plurality of shift registers are used as the scanning signals.

According to the foregoing structure, only by increasing the number of stages of shift registers in the scanning signal line driving circuit, by three, i.e., the number of time segments for supplying video signals to the pixels in the pixel block, from that of the conventional shift registers, it is possible to output scanning signals by time division without such problem that the video signal written in the pixel is affected by pixel fluctuations due to a supply of a video signal into an adjacent pixel.

The image display apparatus having the foregoing structure, wherein:

the scanning signal line driving circuit includes three shift register groups wherein, of all the shift registers provided for respective scanning signal lines, those which correspond to the scanning signal lines connected to pixels to which the video signals are supplied in the i-th order ($1 \leq i \leq 3$) are mutually connected in series; and a scanning signal to be outputted to each of the scanning signal lines connected to the pixels in the i-th shift register group is generated by performing a logical operation to obtain a logical AND of a) an output signal from one of the shift registers in the i-th shift register group, b) an inversed signal of the output signal from the shift register in the i+1-th shift register group (the first shift register group in the case of i=3), and c) a scanning signal generation control signal supplied by a separately provided signal supply line.

According to the foregoing structure wherein three shift register groups are provided, the number of stages of the shift registers in each shift register group can be reduced to ⅓ as compared to the case of connecting all the shift registers in series. Furthermore, when writing video signals in pixels in the block by time division, a scanning signal to be outputted to each of the scanning signal lines connected to the pixels in the i-th shift register group is generated by performing a logical operation to obtain a logical AND of a) an output signal from one of the shift registers in the i-th shift register group, b) an inversed signal of the output signal from the shift register in the i+1-th shift register group (the first shift register group in the case of i=3), and c) a scanning signal generation control signal supplied by a separately provided signal supply line, to compensate for a reduced number of shift registers in one shift register group.

As a result, an operation frequency of the scanning signal line driving circuit can be reduced to ⅓ that is 1 over the number of time segments, as compared to the case of connecting all the shift registers in series, and it is therefore possible to reduce an amount of power consumption.

The image display apparatus having the foregoing structure may be further arranged such that:

the scanning signal line driving circuit includes a plurality of shift registers connected in series, each shift register being provided correspondingly to a group of the scanning signal lines connected to the pixels in each pixel block, the image display apparatus, further comprising:

a time-division circuit which generates from the output signal of the corresponding shift register, the scanning signal to be outputted to each of the scanning signal lines connected to the pixels in each pixel block.

According to the foregoing structure wherein a shift register is provided correspondingly to a group of the scanning signal lines connected to the pixels in each pixel block, the number of stages of the shift registers in each shift register group can be reduced to ⅓ as compared to the case of connecting all the shift registers in series. Furthermore, when writing video signals in pixels in the block by time division, a scanning signal to be outputted to each of the scanning signal lines connected to the pixels in the block is generated from the output signal of the corresponding shift register, to compensate for a reduced number of shift registers in one shift register group.

According to the foregoing structure, since the number of stages of the shift registers of the scanning signal line driving circuit can be reduced, it is possible to reduce an area occupied by the circuit, and the operation frequency of the scanning signal line driving circuit can be reduced can be reduced to ⅓ that is 1 over the number of time segments, as compared to the case of connecting all the shift registers in series, and it is therefore possible to reduce an amount of power consumption.

The image display apparatus having the foregoing structure of the present invention is characterized in that:

the time division circuit includes a) a plurality of analog switches wherein each analog switch is provided for connecting an output signal line of the shift register and each of the scanning signal lines for one pixel block, and b) potential fixing means for fixing a potential of the scanning signal line connected thereto when the analog switch is in the non-conductive state.

According to the foregoing structure, an output signal line of the shift register and each scanning signal line can be conducted by time division by an analog switch. Further, by the potential fixing means, the potential of the scanning signal line connected the analog switch is fixed when the analog switch is in the non-conductive state. As a result, it is possible to prevent the problem of carrying out a writing operation of a video signal in the floating state of the scanning signal line.

As a result, video signals can be surely written in respective pixels in the pixel block by time division.

The image display apparatus having the foregoing structure of the present invention may be further arranged such that:

the time division circuit includes a two-input AND circuit provided for each scanning signal line, wherein a) an output of the shift register is inputted to one of the input terminals of the two-input AND circuit, b) a scanning signal generation control signal is inputted to the other input terminal of the two-input AND circuit from a separately provided signal supply line, and c) an output terminal of the two-input AND circuit is connected to the scanning signal line.

According to the foregoing structure, by performing a logical operation by the AND circuit to obtain a logical AND of the output signal of the shift register and the scanning signal generation control signal, it is possible to supply respective video signals by time division to the scanning signal lines respectively connected to the signal output line of the shift register.

As a result, video signals can be surely written in respective pixels in the pixel block by time division.

Furthermore, the potential of the scanning signal line is defined by the potential of the output terminal of the AND circuit, and it is therefore possible to omit the means for fixing the potential of the scanning signal line when the scanning signal line is set in the non-selection state.

The image display apparatus having the foregoing structure of the present invention is arranged such that:

the time division circuit includes a two-input NOR circuit provided for each scanning signal line, wherein a) an inversed signal of an output of the shift register is inputted to one of the input terminals of the two-input NOR circuit, b) a scanning signal generation control signal is inputted to the other input terminal of the two-input NOR circuit from a separately provided signal supply line, and c) an output terminal of the two-input NOR circuit is connected to the scanning signal line.

According to the foregoing structure, by performing a logical operation by the NOR circuit to obtain a logical NOR of an inversed signal of the output signal of the shift register and the scanning signal generation control signal, it is possible to supply respective video signals by time division to the scanning signal lines respectively connected to the signal output line of the shift register.

As a result, video signals can be surely written in respective pixels in the pixel block by time division.

Furthermore, the potential of the scanning signal line is defined by the potential of the output terminal of the NOR circuit, and it is therefore possible to omit the means for fixing the potential of the scanning signal line when the scanning signal line is set in the non-selection state.

For a fuller understanding of the nature and advantages of the invention, reference should be made to the ensuing detailed description taken in conjunction with the accompanying drawings.

DESCRIPTION OF THE PREFERRED EMBODIMENTS

The following descriptions will explain embodiments of the present invention with reference to figures.

First Embodiment

Figure 1:
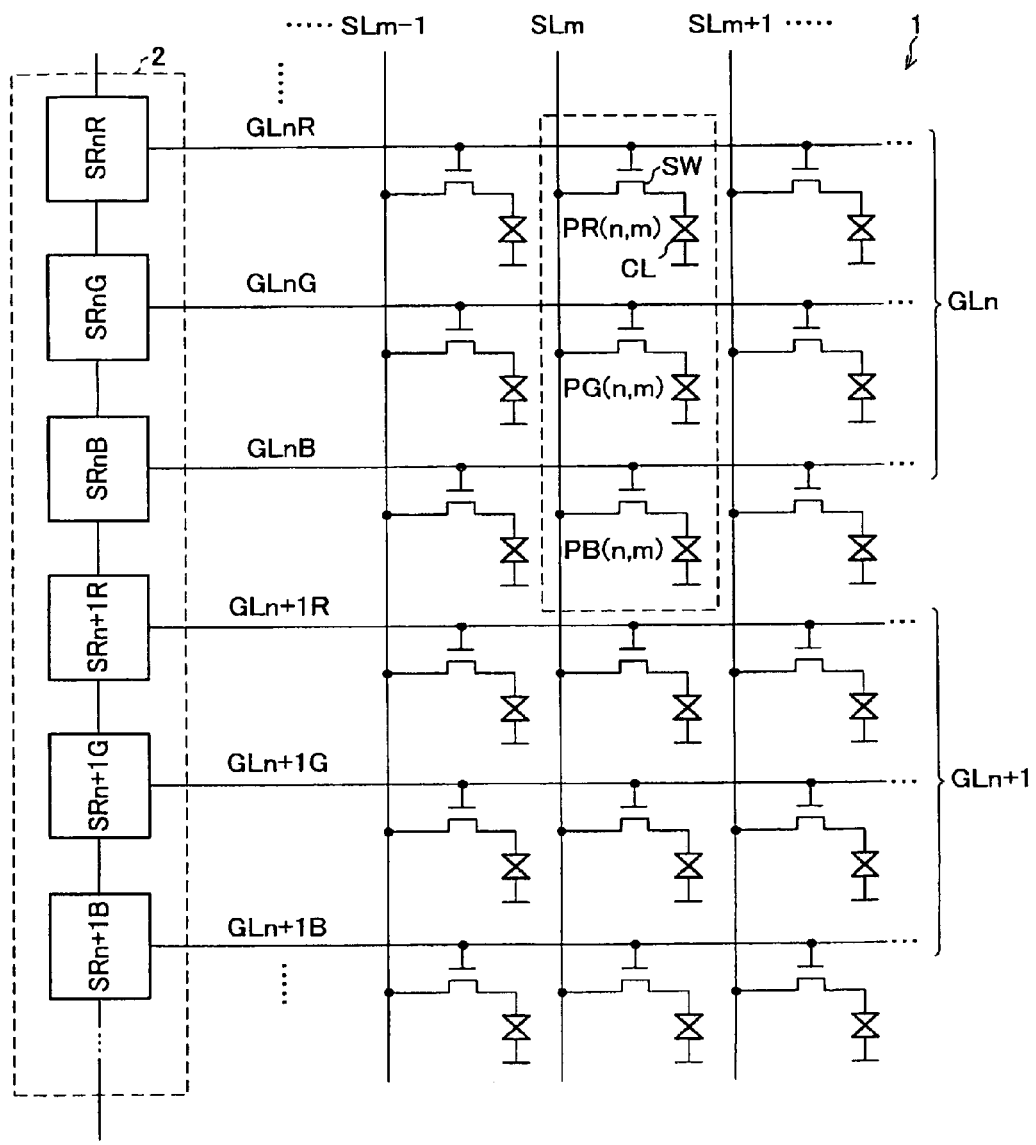
FIG. 1 is a typical depiction showing the structure of an active matrix substrate in accordance with one embodiment of the present invention.
Figure 2:
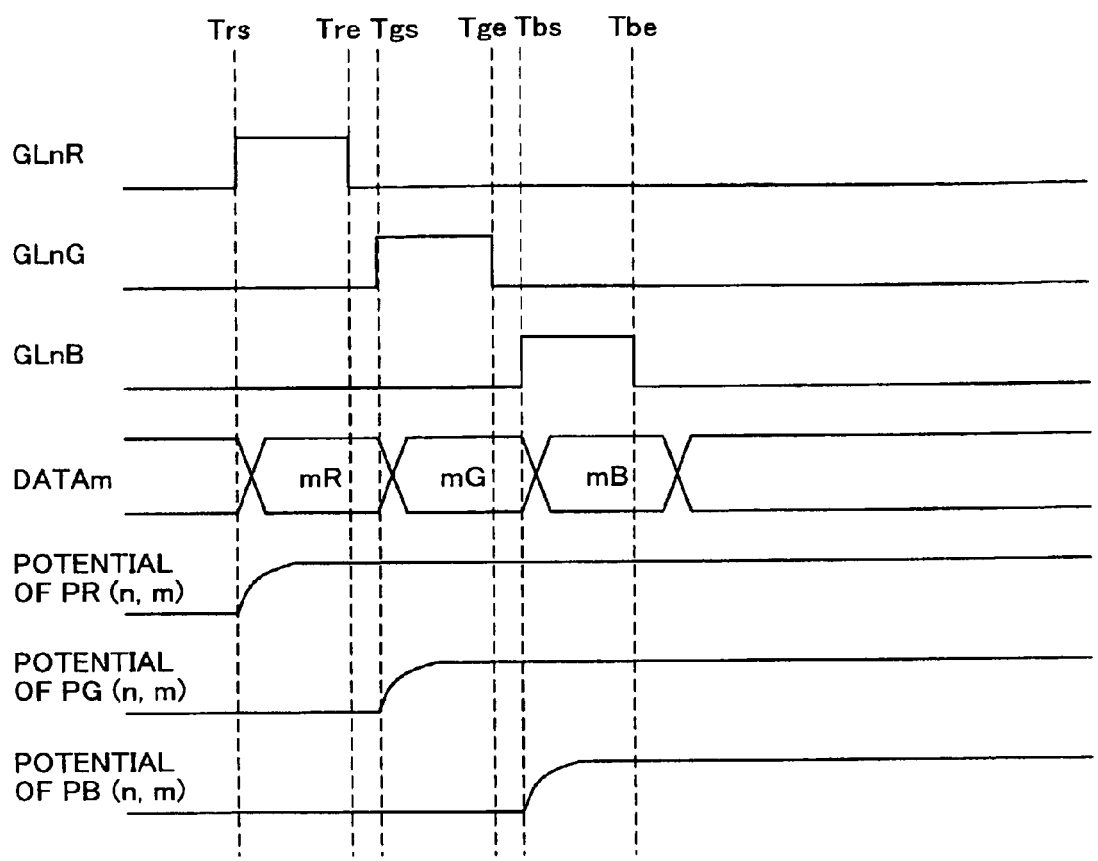
FIG. 2 is a timing chart showing operations of the active matrix substrate of FIG. 1.

The following descriptions will explain one embodiment of the present invention with reference to FIGS. 1 and 2.

Firstly, an active matrix image display apparatus as an image display apparatus of the present invention is explained in reference to FIG. 1.

The image display apparatus in accordance with the present embodiment is a display apparatus in which each pixel group is made up of pixels for respective colors of R(Red), G(Green) and B(Blue) to realize a color display. FIG. 1 is a typical depiction illustrating the structure of the active matrix substrate 1 of the image display apparatus of the present embodiment. On this active matrix substrate 1, formed are a plurality of scanning signal lines GL1, GL2, GL3, . . . , GLn, . . . (hereinafter, a prescribed one of scanning signal lines is referred to as GLn), and a plurality of data signal lines SL1, SL2, SL3, . . . , SLm (hereinafter, a prescribed one of scanning signal lines is referred to as SLm) which are arranged in a matrix form, and a plurality of pixels provided at respective intersections between the scanning signal lines and the data signal lines. The pixels are divided into pixel blocks, each block being made up of three pixels provided for a combination of R, G and B video signals to be supplied by the time division to corresponding pixels.

Similarly, the scanning signal lines are divided into groups, each group is being made up of three scanning signal lines GLnR, GLnG, and GLnB for R, G and B. The pixel block is made up of the three pixels PR(n, m), PG(n, m) and PB (n, m) for R, G and B connected to the foregoing different scanning signal lines GLnR, GLnG, and GLnB in the group of the scanning signal lines. The pixels PR(n, m), PG(n, m) and PB (n, m) are connected to a common data signal line SLm. Each pixel is made up of a pixel capacitance CL, and a switching element SW which connects this pixel capacitance CL with the data signal line. Each scanning signal line is driven by the scanning signal line driving circuit 2. The shift register which constitutes the scanning signal line driving circuit 2 is formed in a unit structure of three shift registers SRnR, SRnG and SRnB for R, G and B so as to correspond to the unit structure of the pixel block made up of three pixels for R, G and B. The scanning signal line driving circuit 2 carries out a scanning operation by sequentially selecting the scanning signal lines GL by supplying scanning pulses (scanning signals) as outputted from the three shift registers SRnR, SRnG and SRnB for R, G and B to the three scanning signal lines GLnR, GLnG, and GLnB for R, G and B. These scanning signal lines GLnR, GLnG, and GLnB are connected to respective control terminals of the switching elements SW of the pixel PR(n, m), PG(n, m) and PB (n, m).

As described, pixels for the same color are aligned along the same scanning signal line. Specifically, pixels for R are aligned along the scanning signal line GLnR, pixels for G are aligned along the scanning signal line GLnG and pixels for B are aligned along the scanning signal line GLnB.

To the data signal line SLm, a signal voltage for three pixels for R, G and B is supplied from the driver IC by the time division. When the scanning signal line GLnR is selected by the scanning signal line driving circuit 2, all the switching elements connected to the scanning signal line GLnR are set in the ON state and a video signal for R is supplied to the pixel PR (n, m). Similarly, when the scanning signal line GLnG is selected by the scanning signal line driving circuit 2, all the switching elements connected to the scanning signal line GLnG are set in the ON state, and a video signal for G is supplied to the pixel PG (n, m). When the scanning signal line GLnB is selected by the scanning signal line driving circuit 2, all the switching elements connected to the scanning signal line GLnB are set in the ON state, and a video signal for B is supplied to the pixel PB (n, m).

Next, operations of the image display apparatus in accordance with the present embodiment will be explained in reference to the timing chart of FIG. 2.

To the data signal line SLm, video signals DATAm for three pixels R, G and B are supplied in time series from the driver IC. The video signals DATAm are a video signal DATAmR for pixel R, a video signal DATAmG for pixel G and a video signal DATAmB for pixel B. The scanning signal lines GLnR, GLnG, and GLnB are sequentially selected by the scanning pulses as sequentially outputted from the shift registers SRnR, SRnG and SRnB which constitute the scanning signal line driving circuit 2.

When the selection period of the scanning signal line GLnR starts at Trs, an operation of writing image data (video signal DATAmR) in the pixel PR (n, m) starts. This operation of writing the image data into the pixel PR (n, m) is stopped at Tre, i.e., the end of the selection period of the scanning signal line GLnR. Similarly, when the selection period of the scanning signal line GLnG starts at Tgs, an operation of writing image data (video signal DATAmG) in the pixel PG (n, m) starts. Here, the scanning signal line GLnR is set in the non-selection period, and thus the potential of the pixel PR (n, m) does not fluctuate by the operation of writing the image data into the pixel PG (n, m). Furthermore, the time division switch is not provided in the data signal line SLm, and it is therefore possible to prevent the problem associated with the conventional structure, i.e., the operation of writing the video signal into the adjacent data signal line is carried out in the state where an output of the time-division switch becomes high impedance, and the data signal line is in the floating state. With the foregoing structure of the present embodiment, the data signal line SLm is not affected by fluctuations in potential of the adjacent data signal lines SLm−1 and SLm+1, and therefore the potential of the pixel PR (n, m) does not fluctuate by the writing operation of the video signals to the adjacent data signal lines SLm−1 and SLm+1.

The foregoing operation of writing the image data into the pixel PG (n, m) is stopped at Tge, i.e., the end of the selection period of the scanning signal line GLnG. Similarly, when the selection period of the scanning signal line GLnB starts at Tbs, an operation of writing image data (video signal DATAmB) in the pixel PB (n, m) starts. Here, the scanning signal line GLnB is set in the non-selection period, and thus the potential of the pixel PG (n, m) does not fluctuate by the operation of writing the image data into the pixel PB (n, m). Furthermore, the time division switch is not provided in the data signal line SLm, and it is therefore possible to prevent the problem associated with the conventional structure, i.e., the operation of writing the video signal into the adjacent data signal line is carried out in the state where an output of the time-division switch becomes high impedance, and the data signal line is in the floating state. With the foregoing structure of the present embodiment, the data signal line SLm is not affected by fluctuations in potential of the adjacent data signal lines SLm−1 and SLm+1, and the potential of the pixel PR (n, m) and the potential of the pixel PG (n, m) do not fluctuate by the writing operation of the video signals to the adjacent data signal lines SLm−1 and SLm+1.

As described, the image display apparatus I accordance with the present invention permits a color display having a plurality of pixels divided into pixel blocks, each being made up of three pixels for colors of red(R), green (G) and blue (B) respectively is arranged such pixels in the same color are aligned in the direction of the scanning signal line, and each pixel block is made up of three pixels for R, G and B aligned in the direction of the data signal line. For the scanning signal line driving circuit 2, a shift register of plural stages is adopted, wherein corresponding to respective colors for R, G and B, the number of stages of the shift registers is three (that is the number of time segments) times as many as that of the conventional time division method. With this arrangement, the scanning signal driving circuit 2 sequentially selects scanning signal lines connected to respective pixels, and the data signal lines are supplied with video signals as outputted in time series from the driver IC. As a result, an image can be displayed by writing the image data into each pixel.

According to the image display apparatus of the present embodiment, it is not necessary to write video signals in respective pixels in the pixel block via respective data signal lines, and thus a time division switch which permits video signals to be supplied by time division method can be omitted from the data signal line SLm. As a result, it is possible to prevent the problem associated with the conventional structure, i.e., the operation of writing the video signal into the adjacent data signal line is carried out in the state where an output of the time-division switch becomes high impedance, and the data signal line is in the floating state. With the foregoing structure of the present embodiment, the problem associated with the convention structure can be prevented, i.e., the data signal line is not affected by fluctuations in potential of the adjacent data signal lines due to a supply of another video signal in adjacent pixel in the pixel block. In the foregoing operation of sequentially selecting the scanning signal lines by the scanning signal line driving circuit 2, the respective switching elements SW of the pixels are in the non-conductive state when the corresponding scanning signal lines are in the non-selective period. Namely, as different scanning signals lines for selecting respective pixels in the pixel block are adopted in the pixel block, when a video signal is being written in one pixel, other pixels to which other video signals are to be written can be set in the non-selective state.

As a result, the image data written in a pixel is not affected by fluctuations in potential of the adjacent scanning signal lines GLm−1 and GLm+1, the adjacent data signal lines SLm−1 and SLm+1, and adjacent pixels.

As described, according to the image display apparatus in accordance with the present embodiment, in the case where each image data block is made up of a plurality of video signals, respective video signals in each block can be written in respective pixel by time division without such problem that a video signal to be written is not affected by fluctuations in pixel by the supply of another video signal.

According to the image display apparatus of the present embodiment, it is not necessary to provide the data signal lines for respective pixels in the pixel block, and it is therefore possible to reduce the number of connection terminals.

The image display apparatus in accordance with the present embodiment shift register which constitutes the scanning signal line driving circuit 2 is formed in a unit structure of three shift registers SRnR, SRnG and SRnB provided respectively for the scanning signal lines GLnR, GLnG and GLnB are connected in series, and an output signal from each shift register serves as a scanning pulse. Therefore, only by increasing the number of stages of the shift registers by k times (k is the number of time segments for supplying video signals to pixels in one pixel block by time division) it is possible to output scanning signals by time division without the problem of the video signal already written in one pixel being affected by potential fluctuations due to a supply of another video signal within one block.

Incidentally, the number of time segments is set to three in the present embodiment, however, the present invention is not intended to be limited to the foregoing structure, and the number K of time segments can be set to any integer of not less than 2. In this case, the number of time segments is k in the above explanations.

Second Embodiment

Figure 3:
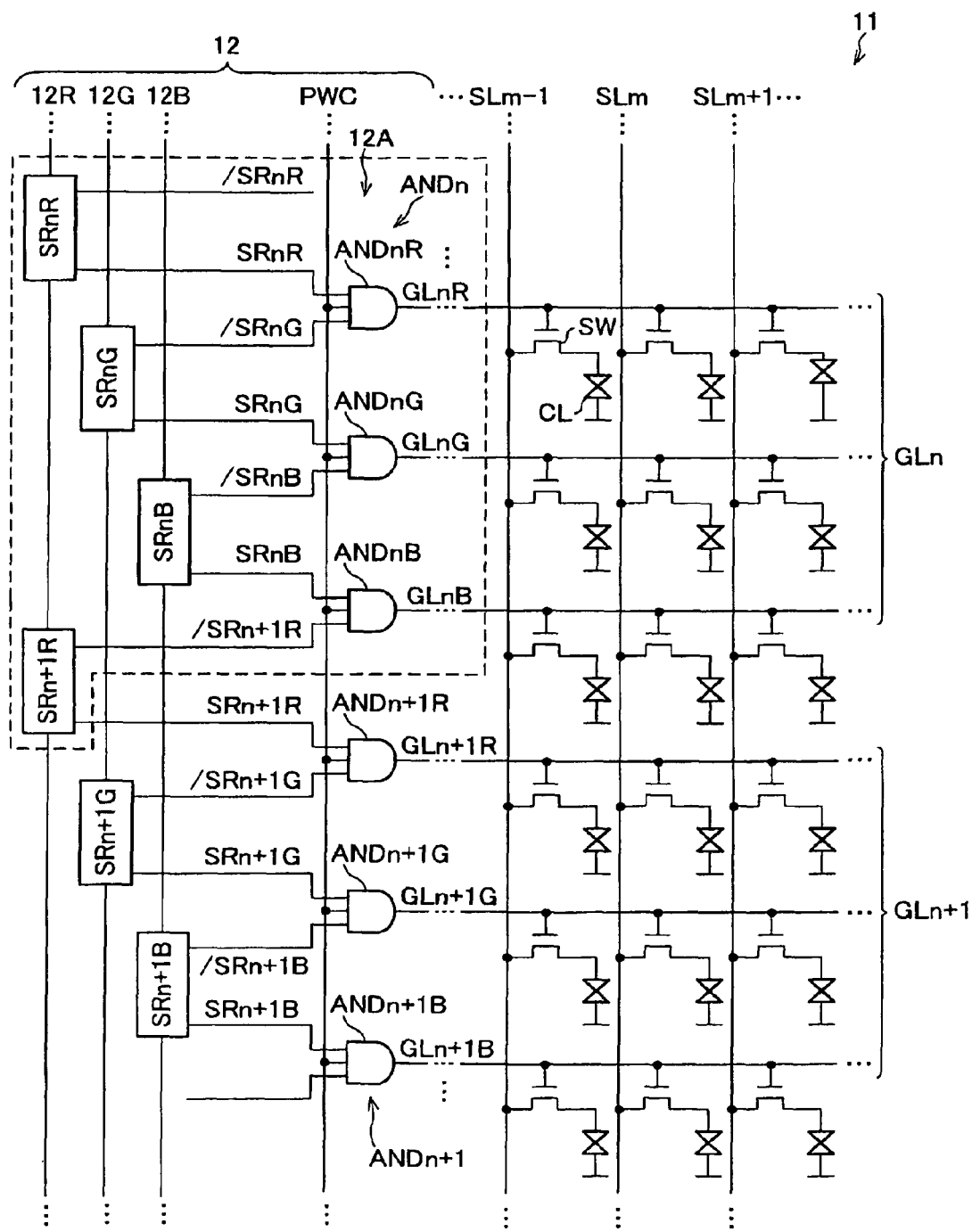
FIG. 3 is a typical depiction showing the structure of an active matrix substrate in accordance with the second embodiment of the present invention.
Figure 4:
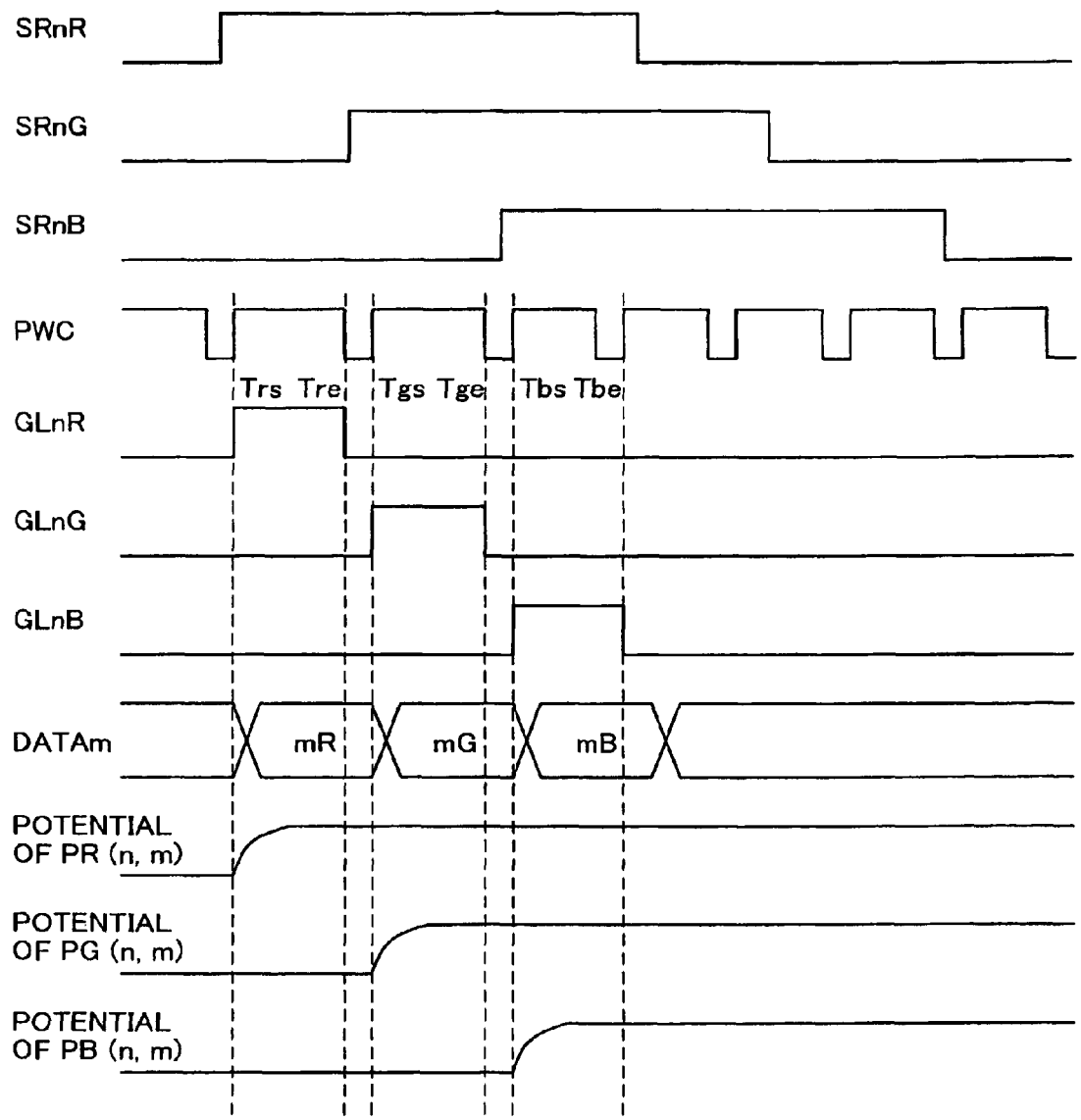
FIG. 4 is a timing chart showing operations of the active matrix substrate of FIG. 3.

The following descriptions will explain the second embodiment of the present invention with reference to FIGS. 3 and 4.

FIG. 3 is a typical depiction showing the structure of an active matrix substrate 11 of the image display apparatus in accordance with the second embodiment of the present invention. As in the first embodiment, the image display apparatus in accordance with the present embodiment is also arranged so that each pixel group is made up of pixels for respective colors of R(Red), G(Green) and B(Blue) to realize a color display. As illustrated in FIG. 3, on this active matrix substrate 11, formed are a plurality of scanning signal lines GL1, GL2, GL3, . . . , GLn, . . . , and a plurality of data signal lines SL1, SL2, SL3, . . . , SLm which are arranged in a matrix form, and a plurality of pixels provided at respective intersections between the scanning signal lines and the data signal lines. The structure of the pixel and the driver IC of the data signal lines are the same as those of the first embodiment.

The image display apparatus of the present embodiment differs from the image display apparatus of the first embodiment in that the scanning signal line driving circuit 12 is made up of a scanning signal line driving circuit 12R for display in R, a scanning signal line driving circuit 12G for display in G, a scanning signal line driving circuit 12B for display in B, a scanning pulse control signal line PWC, and an AND circuit 12A. The scanning signal line driving circuit (shift register group) 12R for display in R is made up of shift registers SR1R, SR2R, . . . and SRnR . . . connected in series. The scanning signal line driving circuit (shift register group) 12G for display in G is made up of shift registers SR1G, SR2G, . . . and SRnG . . . connected in series. The scanning signal line driving circuit (shift register group) 12B for display in B is made up of shift registers SR1B, SR2B, . . . and SRnB . . . connected in series. Namely, the scanning signal line driving circuit 12 is made up of three shift register groups which are mutually independent from each other. In the present embodiment, the scanning signal line driving circuit 12R for display in R is the first shift register group, the scanning signal line driving circuit 12G for display in G is the second shift register group, and the scanning signal line driving circuit 12B for display in B is the third shift register group.

The scanning pulse control signal line PWC is a signal line dedicated to supply a scanning pulse width control signal (scanning signal generation control signal) PWC (for convenience in explanations, the same reference symbol is adopted as the scanning pulse control signal line) which is periodically switched between the High level and the Low level. The AND circuit group 12A is made up of AND1, AND2, and AND3, . . . , ANDn provided corresponding to the scanning signal lines GL1, GL2, GL3, . . . , GLn. The AND gate ANDn further includes the AND gates (AND circuits) ANDnR, ANDnG and ANDnB corresponding to the scanning signal lines GLnR, GLnG and GLnB. The AND circuit group 12A performs a logical operation of scanning pulses, inversed signals of the scanning pulses and scanning pulse width control signals as outputted from the shift registers SRnR, SRnG and SRnB of the three shift register groups.

For example, for the display in R, the AND gate ANDnR performs a logical operation to obtain a logical AND of a) the scanning pulse SRnR as outputted from the shift register SRnR (for convenience in explanations, the same reference symbol is adopted as the shift register not only for SRnR but also for SRnG and SRnB), b) an inversed signal of the scanning pulse /SRnG outputted from the shift register SRnG (for convenience in explanations, the same reference symbol is adopted with bar as the shift register not only for /SRnR but also for /SRnG and /SRnB), and c) the scanning pulse width control signal PWC, and outputs a scanning pulse for selecting the scanning signal line for display in R to the scanning signal line GLnR.

The AND gate ANDnR corresponding to the first pixel for R positioned at the beginning side in the scanning direction performs a logical operation of a logical AND of a) the scanning pulse SRnR as outputted from the shift register SRnR, b) an inversed signal of the scanning pulse /SRnG outputted from the shift register SRnG corresponding to the pixel G next to the pixel for R in the scanning direction, and c) the scanning pulse width control signal PWC, and outputs the resulting scanning pulse to the scanning signal line GLnR. The AND gates ANDnG corresponding to the pixels for G other than those at both ends in the scanning direction perform a logical operation of a logical AND of a) the scanning pulse SRnG as outputted from the shift register SRnG, b) an inversed signal of the scanning pulse /SRnB outputted from the shift register SRnB corresponding to the pixel B next to the pixel for G in the scanning direction, and c) the scanning pulse width control signal PWC, and outputs the resulting scanning pulse to the scanning signal line GLnG. The AND gate ANDnB corresponding to the pixel for B at the end side in the scanning direction performs a logical operation of a logical AND of a) the scanning pulse SRnB as outputted from the shift register SRnB, b) an inversed signal of the scanning pulse /SRn+1R outputted from the shift register SRn+1R corresponding to the pixel R next to the pixel for B in the scanning direction, and c) the scanning pulse width control signal PWC, and outputs a resulting scanning pulse to the scanning signal line GLnB.

Next, operations of the scanning signal line driving circuit 12 will be explained in reference to the timing chart of FIG. 4.

To the data signal line SLm, video signals DATAm for three pixels R, G and B are supplied in time series from the driver IC.

The shift registers SRnR, SRnG and SRnB of the three shift register groups of the scanning signal line driving circuit 12 respectively output scanning pulses SRnR, SRnG and SRnB whose pulse duration is three times as wide as that of the scanning pulse width control signal PWC. The timings of transferring a pulse to the next stage of these three groups of shift registers SRnR, SRnG and SRnB are delayed by the pulse duration of the scanning pulse width control signal PWC, and accordingly these scanning pulses SRnR, SRnG and SRnB are also delayed respectively by one pulse duration of the scanning pulse width control signal PWC.

A scanning pulse GLnR for selecting the scanning signal line GLnR for display in R is generated by a logical operation of a logical AND of a) the scanning pulse SRnR as outputted from the shift register SRnR of the shift registers SRnR, SRnG and SRnB of the three shift register groups which constitute the scanning signal line driving circuit 12, b) an inversed signal of the scanning pulse /SRnG outputted from the shift register SRnG corresponding to the pixel G next to the pixel for R in the scanning direction, and c) the scanning pulse width control signal PWC.

Similarly, a scanning pulse GLnG for selecting the scanning signal line GLnG for display in G is generated by a logical operation of a logical AND of a) the scanning pulse SRnG as outputted from the shift register SRnG, b) an inversed signal of the scanning pulse /SRnB outputted from the shift register SRnB corresponding to the pixel B next to the pixel for G in the scanning direction, and c) the scanning pulse width control signal PWC.

Similarly, a scanning pulse GLnB for selecting the scanning signal line GLnB for display in B is generated by a logical operation of a logical AND of a) the scanning pulse SRnB as outputted from the shift register SRnB, b) an inversed signal of the scanning pulse /SRn+1R outputted from the shift register SRn+1R corresponding to the pixel R next to the pixel for B in the scanning direction, and c) the scanning pulse width control signal PWC. Then, the scanning pulses GLnR, GLnG and GLnB for R, G and B display thus generated are sequentially supplied to the corresponding three scanning signal lines GLnR, GLnG and GLnB for R, G and B in order by time division in which one horizontal scanning period is divided into three time segments.

When the selection period of the scanning signal line GLnR starts at Trs, an operation of writing image data (video signal DATAmR) in the pixel PR (n, m) starts. This operation of writing the image data into the pixel PR (n, m) is stopped at Tre, i.e., the end of the selection period of the scanning signal line GLnR. Similarly, when the selection period of the scanning signal line GLnG starts at Tgs, an operation of writing image data (video signal DATAmG) in the pixel PG (n, m) starts. Here, the scanning signal line GLnR is set in the non-selection period, and thus the potential of the pixel PR (n, m) does not fluctuate by the operation of writing the image data into the pixel PG (n, m). Furthermore, the time division switch is not provided in the data signal line SLm, and it is therefore possible to prevent the problem associated with the conventional structure, i.e., the operation of writing the video signal into the adjacent data signal line is carried out in the state where an output of the time-division switch becomes high impedance, and the data signal line is in the floating state. With the foregoing structure of the present embodiment, the data signal line SLm is not affected by fluctuations in potential of the adjacent data signal lines SLm−1 and SLm+1, and the potential of the pixel PR (n, m) does not fluctuate by the writing operation of the video signals to the adjacent data signal lines SLm−1 and SLm+1.

The foregoing operation of writing the image data into the pixel PG (n, m) is stopped at Tge, i.e., the end of the selection period of the scanning signal line GLnG. Similarly, when the selection period of the scanning signal line GLnB starts at Tbs, an operation of writing image data (video signal DATAmB) in the pixel PB (n, m) starts. Here, the scanning signal lines GLnR and GLnG are set in the non-selection period, and thus the potential of the pixel PR (n, m) and the potential of the pixel PG (n, m) do not fluctuate by the operation of writing the image data into the pixel PB (n, m). Furthermore, the time division switch is not provided in the data signal line SLm, and it is therefore possible to prevent the problem associated with the conventional structure, i.e., the operation of writing the video signal into the adjacent data signal line is carried out in the state where an output of the time-division switch becomes high impedance, and the data signal line is in the floating state. With the foregoing structure of the present embodiment, the data signal line SLm is not affected by fluctuations in potential of the adjacent data signal lines SLm−1 and SLm+1, and the potential of the pixel PR (n, m) and the potential of the pixel PG (n, m) do not fluctuate by the writing operation of the video signals to the adjacent data signal lines SLm−1 and SLm+1.

As described, the image display apparatus in accordance with the present embodiment has the structure of the first embodiment, and is further characterized by adopting the scanning signal line driving circuit 12 made up of shift registers SRnR, SRnG and SRnB of the three shift register groups. The scanning signal line driving circuit 12 outputs the scanning signals GLnR, GLnG and GLnB for display in R, G and B generated by performing a logical operation of a) scanning pulses as outputted from the shift registers SRnR, SRnG and SRnB, the inversed signals of the scanning pulses and the scanning pulse width control signals PWC, to the scanning signal lines GLnR, GLnG and GLnB for display in R, G and B.

As explained, according to the image display apparatus in accordance with the present embodiment, the same effect as achieved from the image display apparatus in accordance with the first embodiment can be achieved. That is, as the time-division switch is not provided in the data signal line SLm, it is possible to prevent the problem associated with the conventional structure, i.e., the operation of writing the video signal into the adjacent data signal line is carried out in the state where an output of the time-division switch becomes high impedance, and the data signal line is in the floating state. Therefore, the potential of the video signal already written does not fluctuate as being affected by the potential fluctuations of the adjacent data signal lines resulting from the supply of other video signals in adjacent pixels in the pixel block. Moreover, when scanning signal lines are sequentially selected by the scanning signal line driving circuit 12, the switching element SW of the pixel is switched OFF when the scanning signal line is in the non-selection state. Namely, since the scanning signal lines for selecting respective pixels in the pixel block are mutually different, within the block, when writing a video signal in a prescribed pixel, other pixels which receive other video signals can be set in the non-selection period.

As a result, the image data written in a pixel can be prevented from being affected by fluctuations in potential of adjacent scanning signal lines GLm−1, GLm+1, data signal lines SLm−1, SLm+1, and pixels.

According to the image display apparatus in accordance with the present embodiment wherein image data is divided into blocks, each being made up of a combination of a plurality of video signals, and respective video signals for each block are supplied to pixels by time division, a video signal written in a prescribed pixel can be prevented from being affected by fluctuations in potential due to a supply of another video signal to an adjacent pixel.

As described, the image display apparatus in accordance with the present embodiment, it is not necessary to provide a data signal line for each of the pixels in the pixel block, it is therefore possible to reduce the number of connection terminals.

According to the image display apparatus of the present embodiment, the scanning signal line driving circuit 12 is provided with shift register groups (the scanning signal line driving circuit 12R for display in R, the scanning signal line driving circuit 12G for display in G, the scanning signal line driving circuit 12B for display in B), wherein, of all the shift registers SRnR, SRnG and SRnB provided for respective scanning signal lines GLnR, GLnG and GLnB, those which correspond to the scanning signal lines connected to the pixels to which the video signals are supplied in the i-th order ($1 \leq i \leq$ number of time segments=3) are mutually connected in series. Then, a scanning signal to be outputted to each of the scanning signal lines connected to the pixels in the i-th line is generated by performing a logical operation to obtain a logical AND of a) an output signal from one of the shift registers in the i-th shift register group, b) an inversed signal of the output signal from the shift register in the i+1-th shift register group (the first shift register group in the case of i=3), and c) a scanning pulse width control signal PWC supplied by a separately provided signal supply line.

According to the foregoing structure wherein three shift register groups are provided, the number of stages of the shift registers in each shift register group can be reduced to ⅓ as compared to the case of connecting all the shift registers in series. Furthermore, when writing video signals in pixels in the block by time division, a scanning signal to be outputted to each of the scanning signal lines connected to the pixels in the i-th shift register group is generated by performing a logical operation to obtain a logical AND of a) an output signal from one of the shift registers in the i-th shift register group, b) an inversed signal of the output signal from the shift register in the i+1-th shift register group (the first shift register group in the case of i=3), and c) a scanning pulse width control signal, to compensate for a reduced number of shift registers in one shift register group.

As a result, an operation frequency of the scanning signal line driving circuit can be reduced to ⅓ that is 1 over the number of time segments, as compared to the case of connecting all the shift registers in series, and it is therefore possible to reduce an amount of power consumption.

Incidentally, the number of time segments is set to three in the present embodiment, however, the present invention is not intended to be limited to the foregoing structure, and the number K of time segments can be set to any integer of not less than 2. In this case, the number of time segments is k in the above explanations.

Third Embodiment

Figure 5:
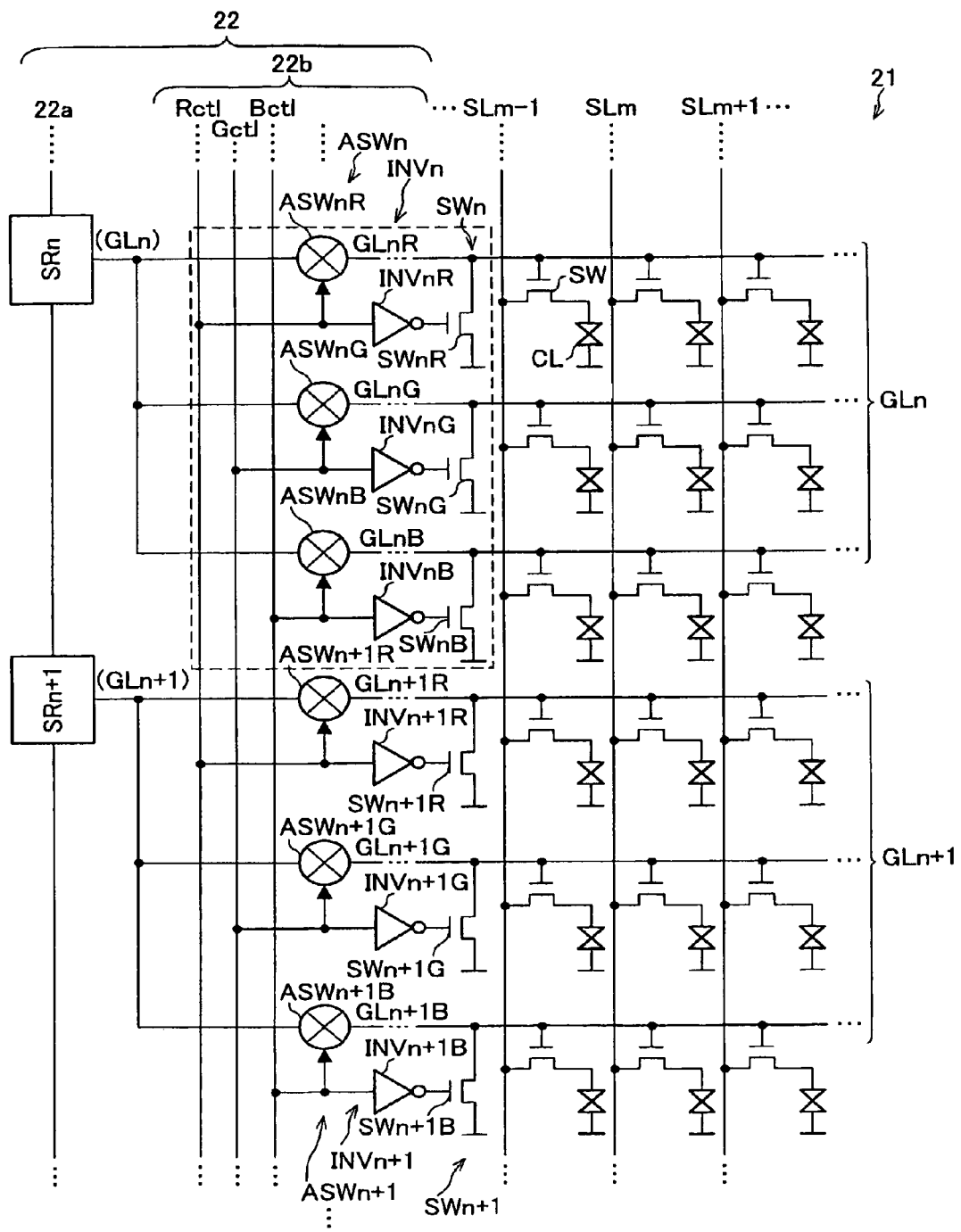
FIG. 5 is a typical depiction showing the structure of an active matrix substrate in accordance with the third embodiment of the present invention.
Figure 6:
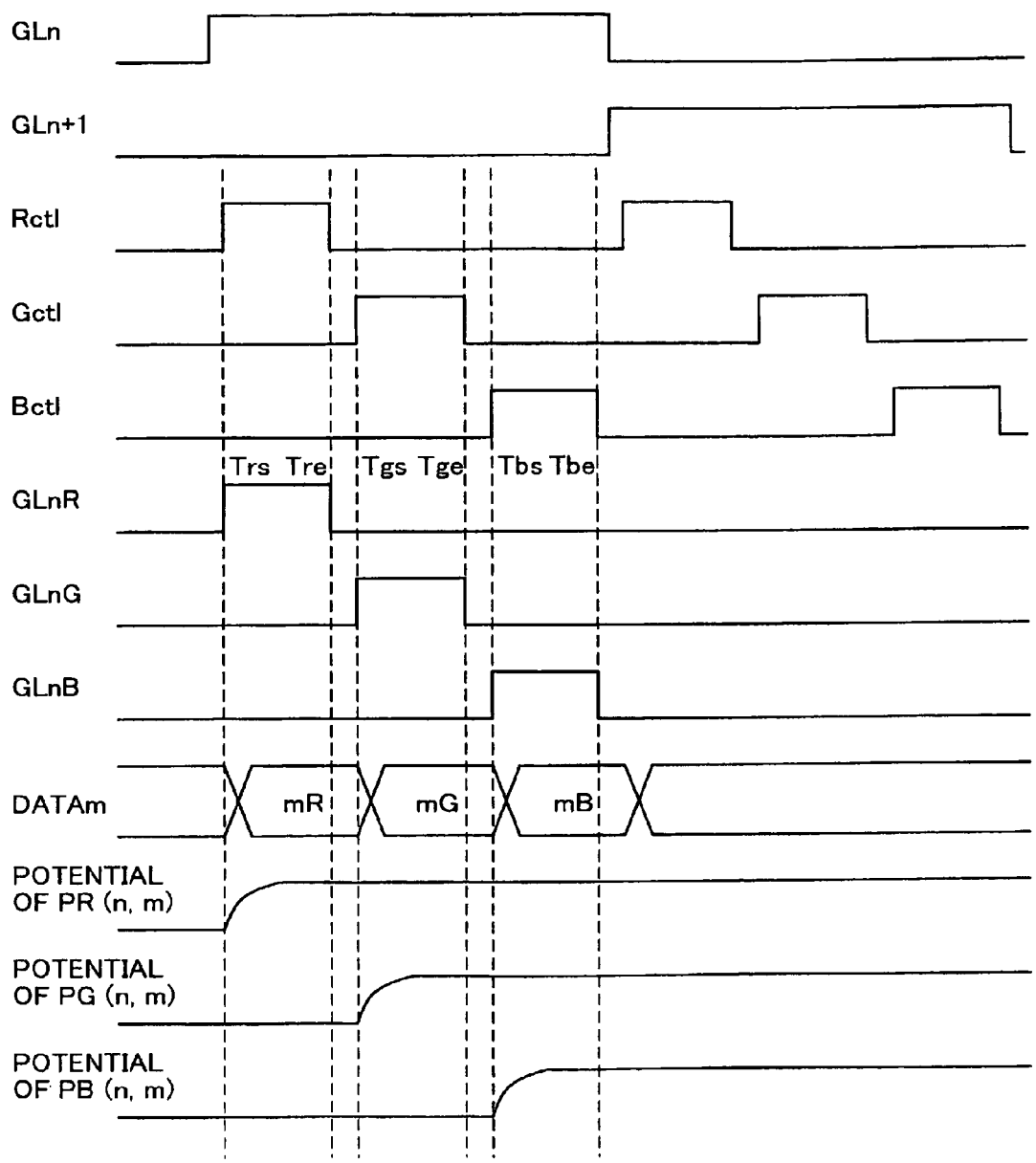
FIG. 6 is a timing chart showing operations of the active matrix substrate of FIG. 5.

The following descriptions will explain the third embodiment of the present invention with reference to FIGS. 5 and 6.

FIG. 5 is a typical depiction showing the structure of an active matrix substrate 21 of the image display apparatus in accordance with the second embodiment of the present invention. As in the first and second embodiments, the image display apparatus in accordance with the present embodiment is also arranged so that each pixel group is made up of pixels for respective colors of R(Red), G(Green) and B(Blue) to realize a color display.

As illustrated in FIG. 5, on this active matrix substrate 21, formed are a plurality of scanning signal lines GL1, GL2, GL3, . . . , GLn, . . . , and a plurality of data signal lines SL1, SL2, SL3, . . . , SLm which are arranged in a matrix form, and a plurality of pixels provided at respective intersections between the scanning signal lines and the data signal lines. The structure of the pixel and the driver IC of the data signal lines are the same as those of the first embodiment.

The image display apparatus in accordance with the present embodiment differs from the image display apparatus of the first embodiment in that the scanning signal line driving circuit 22 which is provided with a common scanning signal line driving circuit 22a for R, G and B, and a time division circuit 22b is adopted in the present embodiment.

The common scanning signal line driving circuit 22a for R, G and B is made up of shift registers SR1, SR2, SR3, . . . , SRn which are used in common among respective pixels for R, G and B. Specifically, one shift register SRn is provided correspondingly to a group of the scanning signal lines GLnR, GLnG and GLnB connected to the pixels in each pixel block. All of these shift registers are connected in series from the beginning side end to the end side in the scanning direction. To the output end of the shift register SRn, one output signal line GLn (for convenience in explanations, the same reference numeral as the scanning signal line GLn is used) is connected, which is branched into the scanning signal lines GLnR, GLnG and GLnB.

The time division circuit 22b generates from output signals of the shift registers, scanning pulses to be outputted to the scanning signal lines corresponding respectively to pixels in each pixel block. This time division circuit 22b includes time division switches ASW1, ASW2, ASW3, . . . , ASWn, time division switch control signal lines Rct1, Gct1, Bct1, switches SW1, SW2, SW3, . . . , SWn, inverters INV1, INV2, INV2, INVn. The time division switch ASWn is made up of time division switches ASWnR, ASWnG, and ASWnB. The inverter INVn is made up of inverters INVnR, INVnG, and INVnB. The switch SWn is made up of switches SWnR, SWnG and SWnB.

The time division switch ASWnR is provided so as to connect one end of the output signal line GLn and one end of the scanning signal line GLnR, the time division switch ASWnG is provided so as to connect one end of the output signal line GLn and one end of the scanning signal line GLnG, and the time division switch ASWnB is provided so as to connect one end of the output signal line GLn and one end of the scanning signal line GLnB. Namely, respective input terminals of the time division switches ASWnR, ASWnG, ASWnB are connected in common to the connection terminal which is connected to the output signal line GLn of the common scanning signal driving circuit 22a for R, G and B. These time division switches ASWnR, ASWnG and ASWnB are analog switches of the structure of CMOS, NMOS or PMOS, for example.

The time division switch control signal line Rct1 is provided for controlling ON/OFF of the time division switch ASWnR connected to the control input terminal of the time division switch ASWnR. This time division switch control signal line Rct1 is provided in common among all the time division switches for R. The time division switch control signal line Gct1 is provided for controlling ON/OFF of the time division switch ASWnG connected to the control input terminal of the time division switch ASWnG. This time division switch control signal line Gct1 is provided in common among all the time division switches for G. The time division switch control signal line Bct1 is provided for controlling ON/OFF of the time division switch ASWnR connected to the control input terminal of the time division switch ASWnB. This time division switch control signal line Bct1 is provided in common among all the time division switches for B. These three time division switch control signal lines are provided along the data signal line. These time division switch control signal lines Rct1, Gct1, and Bct1 are supplied with time division switch control signals (scanning signal generation control signal) Rct1, Gct1, Bct1 for sequentially setting ON these time division switches ASWnR, ASWnG and ASWnB by time division (for convenience in explanation, the same reference numerals are adopted for the time division switch control signal line). The time division switches ASWnR, ASWnG and ASWnB are sequentially set ON in response to the time division switch control signals Rct1, Gct1, and Bct1.

As a result, the scanning pulse as outputted in time series from the common scanning signal line driving circuit 22a for R, G and B is inputted to each input terminal of the time division switches ASWnR, ASWnG, and ASWnB via the common signal line GLn, and is outputted from the output terminal of the time division switch which is set in the ON state to be outputted to the scanning signal line connected thereto.

As described, the scanning signal line driving circuit 22 has the structure wherein scanning signal lines are divided into scanning signal line groups, each being made up of scanning signal line GLnR, GLnG and GLnB for R, G and B, and output signals to be applied to these scanning signal line GLnR, GLnG and GLnB in the group by time division by switching ON/OFF of the time division switch ASWnR, ASWnG and ASWnB. As a result, the scanning signal lines can be driven by time division. FIG. 5 shows the case where the scanning signal lines GLnR, GLnG and GLnB correspondingly for R, G and B are driven by time division method in which the transmission time is divided into three time segments. In the structure of FIG. 5, signals outputted in time series from the common scanning signal line driving circuit 22a for R, G and B to the output signal lines GL1, GL2, GL3, . . . , GLn are supplied to the scanning signal lines by dividing one horizontal period into three time segments.

Incidentally, in the case of adopting the analog switches for the time division switches ASWnR, ASWnG and ASWnB, the following problem arises. That is, in the state where the pulse (ON control signal) is not supplied from the time division switch control signal line Rct1, Gct1, Bct1, the time division switch is set in the OFF state (non-conductive state), and the scanning signal lines GLnR, GLnG and GLnB are in the floating state. In response, the present embodiment adopts the switches SWnR, SWnG and SWnB. As shown in FIG. 5, these switches SWnR, SWnG and SWnG are, for example, NMOS transistors, which pull down the scanning signal lines GLnR, GLnG and GLnB in the ON state. With this structure, the scanning signal lines GLnR, GLnG and GLnB can be maintained at a Low level in the state where a pulse for setting ON the time division switches ASWnR, ASWnG and ASWnB is not inputted. The inverters INVnR, INVnG and INVnB are provided for inputting to the switch SWnR, SWnG and SWnB, reversed signals of the control signals inputted to the time division switches ASWnR, ASWnG and ASWnB from the time division switch control signal lines Rct1, Gct1, Bct1. In this example, the NMOS transistors are adopted for the switches SWnR, SWnG and SWnB, and the switches SWn and the inverters INVn constitute the potential fixing means.

By the time division switch ASWn (analog switch), it is possible to conduct the output signal line GLn of the shift register SRn ands respective scanning signal lines GLnR, GLnG and GLnB. Then, respective time division switches ASWn are in the OFF state, the potential of the scanning signal line connected to the time division switch is fixed by the potential fixing means, to prevent the scanning signal line from being floating. As a result, it is possible to surely write the video signals by time division within the same pixel block.

The operations of the circuit having the foregoing structure will be explained in reference to the timing chart of FIG. 6.

To the data signal line SLm, supplied in time series are video signals DATAm for three pixels R, G and B from the driver IC. By the scanning pulses as sequentially outputted from the shift registers SR1, SR2, SR3, SRn which constitute the common scanning signal line driving circuit 22a for R, G and B, the output signal lines GL1, GL2, GL3, . . . , GLn are sequentially selected.

The time division switch control signals Rct1, Gct1, Bct1 as externally applied are supplied as pulse signals at intervals of not less than 1 pulse to every two time division switch control signal lines Rct1, Gct1, and Bct1.

As shown in FIG. 6, in the case where the pulse of the time division switch control signal Rct1 is in the High level in the period from Trs to Tre, the pulse of the time division switch control signal Gct1 is delayed from the time division switch control signal Rct1 by the time (Tgs-Trs), and the pulse of the time division switch control signal Bct1 is delayed from the time division switch control signal Gct1 by the time (Tbs-Tgs). The pulse width of each of the time division switch control signals Rct1, Gct1, Bct1 are Tre-Trs, Tge-Tgs and Tbe-Tbs respectively which are all equal.

The time division switches ASWnR, ASWnG and ASWnB for R, G and B are sequentially set in the ON state to supply the scanning pulses to be outputted in time series from the common scanning signal line driving circuit 22 for R, G and B to the output signal line GLn to the corresponding three scanning signal lines GLnR, GLnG and GLnB by dividing one horizontal scanning period into three time segments.

When the selection period of the scanning signal line GLnR starts at Trs, an operation of writing image data (video signal DATAmR) in the pixel PR (n, m) starts. This operation of writing the image data into the pixel PR (n, m) is stopped at Tre, i.e., the end of the selection period of the scanning signal line GLnR. Similarly, when the selection period of the scanning signal line GLnG starts at Tgs, an operation of writing image data (video signal DATAmG) in the pixel PG (n, m) starts. Here, the scanning signal line GLnR is set in the non-selection period, and the potential of the pixel PR (n, m) does not fluctuate by the operation of writing the image data into the pixel PG (n, m). Furthermore, the time division switch is not provided in the data signal line SLm, and it is therefore possible to prevent the problem associated with the conventional structure, i.e., the operation of writing the video signal into the adjacent data signal line is carried out in the state where an output of the time-division switch becomes high impedance, and the data signal line is in the floating state. With the foregoing structure of the present embodiment, the data signal line SLm is not affected by fluctuations in potential of the adjacent data signal lines SLm−1 and SLm+1, and the potential of the pixel PR (n, m) does not fluctuate by the writing operation of the video signals to the adjacent data signal lines SLm−1 and SLm+1.

The foregoing operation of writing the image data into the pixel PG (n, m) is stopped at Tge, i.e., the end of the selection period of the scanning signal line GLnG. Similarly, when the selection period of the scanning signal line GLnB starts at Tbs, an operation of writing image data (video signal DATAmB) in the pixel PB (n, m) starts. Here, the scanning signal lines GLnR and GLnG are in the non-selection period, and the potentials of the pixel PR (n, m), PG(n, m) do not fluctuate by the operation of writing the image data into the pixel PB (n, m). Furthermore, the time division switch is not provided in the data signal line SLm, and it is therefore possible to prevent the problem associated with the conventional structure, i.e., the operation of writing the video signal into the adjacent data signal line is carried out in the state where an output of the time-division switch becomes high impedance, and the data signal line is in the floating state. With the foregoing structure of the present embodiment, the data signal line SLm is not affected by fluctuations in potential of the adjacent data signal lines SLm−1 and SLm+1, and the potential of the pixel PR (n, m) and the potential of the pixel PG (n, m) do not fluctuate by the writing operation of the video signals to the adjacent data signal lines SLm−1 and SLm+1.

As explained, according to the image display apparatus in accordance with the present embodiment, the same effect as achieved from the image display apparatuses in accordance with the first and second embodiments can be achieved. That is, as the time-division switch is not provided in the data signal line SLm, it is possible to prevent the problem associated with the conventional structure, i.e., the operation of writing the video signal into the adjacent data signal line is carried out in the state where an output of the time-division switch becomes high impedance, and the data signal line is in the floating state. Therefore, the potential of the video signal already written does not fluctuate as being affected by the potential fluctuations of the adjacent data signal lines resulting from the supply of other video signals in adjacent pixels in the pixel block. Moreover, when scanning signal lines are sequentially selected by the scanning signal line driving circuit 12, the switching element SW of the pixel is switched OFF when the scanning signal line is in the non-selection state. Namely, since the scanning signal lines for selecting respective pixels in the pixel block are mutually different, within the block, when writing a video signal in a prescribed pixel, other pixels which receive other video signals can be set in the non-selection period.

As a result, the image data written in a pixel can be prevented from being affected by fluctuations in potential of adjacent scanning signal lines GLn−1, GLn+1, data signal lines SLm−1, SLm+1, and pixels.

As described, according to the image display apparatus in accordance with the present embodiment, in the case where each image data block is made up of a plurality of video signals for R, G and B, respective video signals in each block can be written in respective pixel by time division without such problem that a video signal to be written is not affected by fluctuations in pixel by the supply of another video signal.

As described, the image display apparatus in accordance with the present embodiment, it is not necessary to provide a data signal line for each of the pixels in the pixel block, it is therefore possible to reduce the number of connection terminals.

In the image display apparatus in accordance with the present embodiment, the time division driving method is adopted for the scanning signal line driving circuit in the image display apparatuses in the first and second embodiments. The scanning signal line driving circuit 22 has the structure wherein scanning signal lines are divided into scanning signal line groups, each being made up of scanning signal line GLnR, GLnG and GLnB, and it is therefore possible to reduce the number of stages of the shift registers in each shift register group can be reduced to ⅓, that is 1 over the number of time segments, as compared to the case of connecting all the shift registers in series. Furthermore, when writing video signals in respective pixels in the block by time division, a scanning signal to be outputted to each of the scanning signal lines connected to the pixels in the same block is generated from an output signal of the corresponding shift register to compensate for a reduced number of shift registers in one shift register group.

According to the foregoing structure, since the number of stages of the shift registers of the scanning signal line driving circuit can be reduced, it is possible to reduce an area occupied by the circuit to ⅓, and to reduce the operation frequency of the scanning signal line driving circuit to ⅓ that is 1 over the number of time segments, as compared to the case of connecting all the shift registers in series as compared to the structure of the first or second embodiment, and it is therefore possible to reduce an amount of power consumption.

Incidentally, the number of time segments is set to three in the present embodiment, however, the present invention is not intended to be limited to the foregoing structure, and the number K of time segments can be set to any integer of not less than 2. In this case, the number of time segments is k in the above explanations.

Fourth Embodiment

Figure 7:
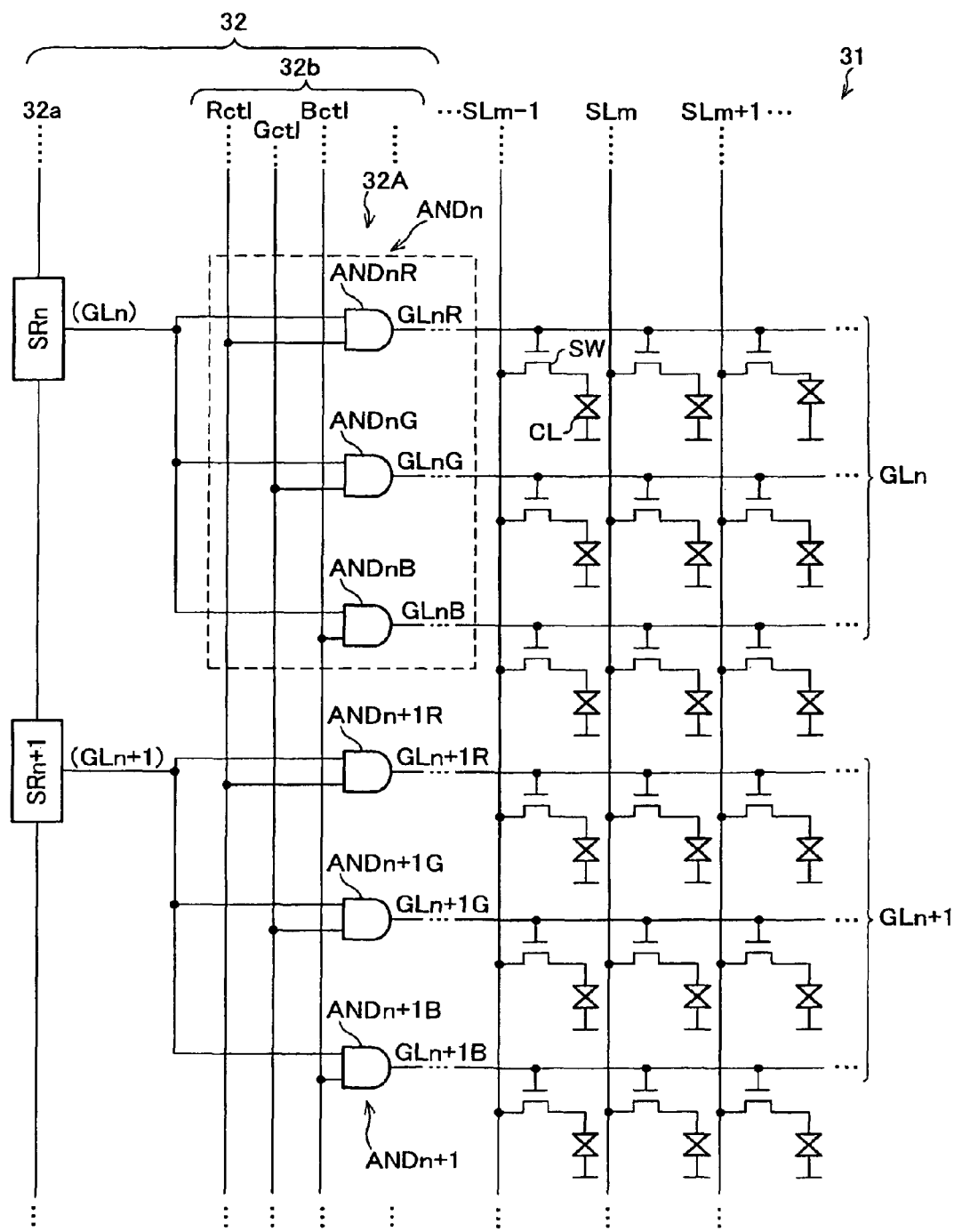
FIG. 7 is a typical depiction showing the structure of an active matrix substrate in accordance with the fourth embodiment of the present invention.
Figure 8:
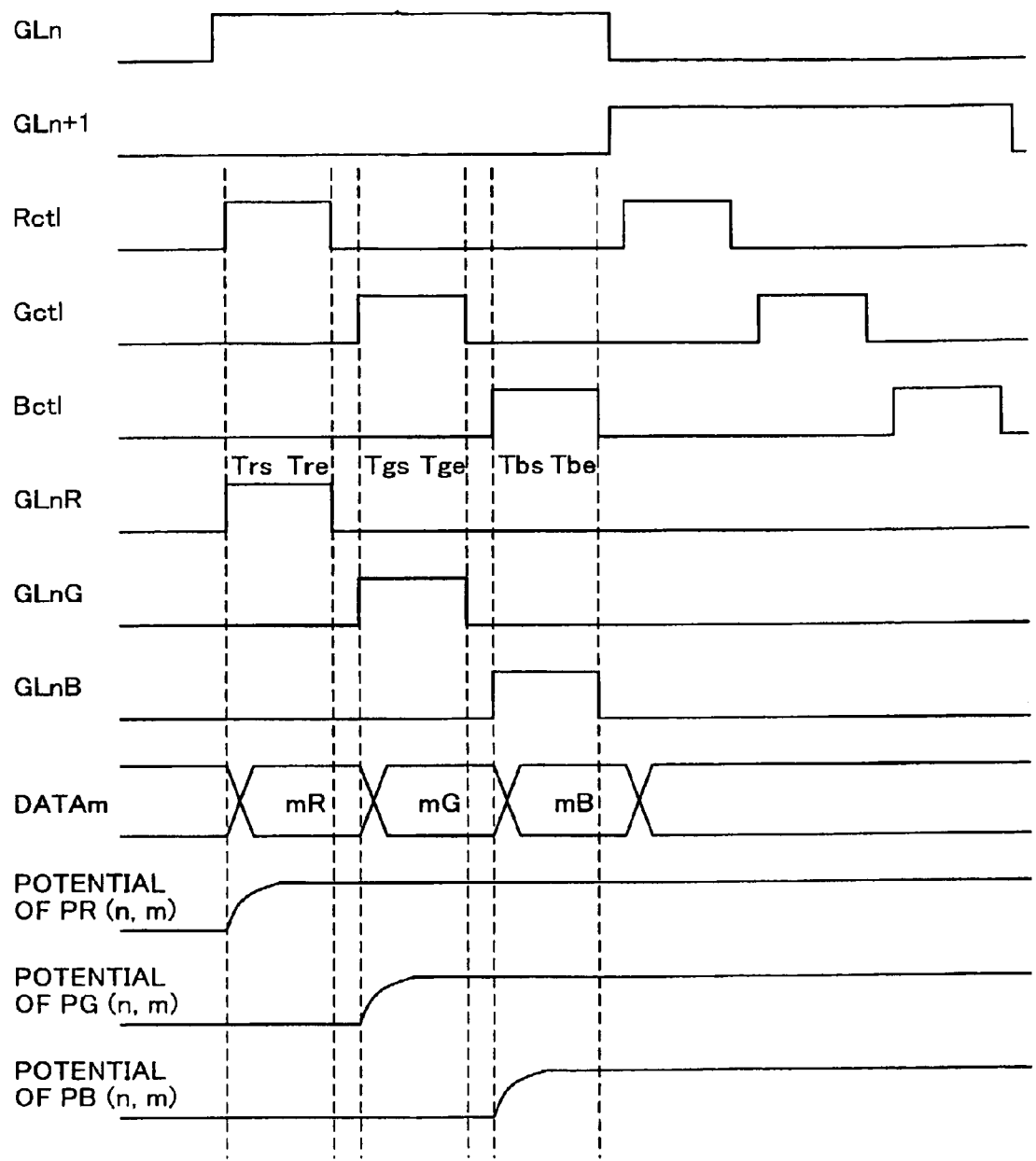
FIG. 8 is a timing chart showing operations of the active matrix substrate of FIG. 7.

The following descriptions will explain the fourth embodiment of the present invention with reference to FIGS. 7 and 8.

FIG. 7 is a typical depiction showing the structure of an active matrix substrate 31 of the image display apparatus in accordance with the second embodiment of the present invention. As in the first through third embodiments, the image display apparatus in accordance with the present embodiment is also arranged so that each pixel group is made up of pixels for respective colors of R(Red), G(Green) and B(Blue) to realize a color display.

As illustrated in FIG. 7, on this active matrix substrate 31, formed are a plurality of scanning signal lines GL1, GL2, GL3, ..., GLn, ..., and a plurality of data signal lines SL1, SL2, SL3, ..., SLm which are arranged in a matrix form, and a plurality of pixels provided at respective intersections between the scanning signal lines and the data signal lines. The structure of the pixel and the driver IC of the data signal lines are the same as those of the first embodiment.

The image display apparatus in accordance with the present embodiment differs from the image display apparatus of the first embodiment in that the scanning signal line driving circuit 32 which is provided with a common scanning signal line driving circuit 32a for R, G and B, and a time division circuit 32b is adopted in the present embodiment.

The common scanning signal line driving circuit 32a for R, G and B is made up of shift registers SR1, SR2, SR3, ..., SRn which are used in common among respective pixels for R, G and B. Specifically, one shift register SRn is provided correspondingly to a group of the scanning signal lines GLnR, GLnG and GLnB connected to the pixels in each pixel block. All of these shift registers are connected in series from the beginning side to the end side in the scanning direction. To the output end of the shift register SRn, one output signal line GLn (for convenience in explanations, the same reference numeral as the scanning signal line GLn is used) is connected, which is branched into the scanning signal lines GLnR, GLnG and GLnB.

The time division circuit 32b includes an AND circuit 32A, time division control signal lines Rct1, Gct1, and Bct1. The AND circuit 32A is made up of AND gates AND1, AND2, AND3, ..., ANDn. The AND gate ANDn is made up of AND gates ANDnR, ANDnG and ANDnB provided respectively for the scanning signal lines.

The AND gate ANDn are two-input AND gates of the structure of CMOS, NMOS or PMOS, and are provided between the output signal line GLn of the shift register SRn and the three scanning signal lines GLnR, GLnG and GLnB for R, G and B. Namely, the respective input terminals on one side of the AND gates ANDnR ANDnG and ANDnB are connected in common to the output signal line GLn of the shift register SRn. The input terminal on the other side of the AND gates ANDnR is connected to the time division control signal line Rct1, the input terminal of the AND gate ANDnG on the other side is connected to the time division control signal line Gct1, and the input terminal of the AND gate ANDnB on the other side is connected to the time division control signal line Bct1. The output terminal of the AND gate ANDnR is connected to one end of the scanning signal line GLnR, and the output terminal of the AND gate ANDnG is connected to one terminal of the scanning signal line GLnG, and the output terminal of the AND gate ANDnB is connected to one end of the scanning signal line GLnB.

The time division control signal lines Rct1, Gct1 and Bct1 are lines separately provided from the signal supply line for video signals, for supplying time division control signals (scanning signal generation control signals) Rct1, Gct1, Bct1 (for convenience in explanations, the same reference symbols are used as the time division control signal lines) for controlling the selection of image data among R, G and B. These time division control signal lines Rct1, Gct1, and Bct1 are provided along the data signal line SLm. The time division control signal line Rct1 is used in common among all the AND gates for R, the time division control signal line Gct1 is used in common among all the AND gates for G, and the time division control signal line Bct1 is used in common among all the AND gates for B.

According to the image display apparatus in accordance with the present embodiment, scanning signal lines are divided into scanning signal line groups, each being made up of scanning signal line GLnR, GLnG and GLnB for R, G and B, and output signals to be applied to these scanning signal line GLnR, GLnG and GLnB in the group by time division. With this structure, the scanning signal line driving circuit 32 can drive the scanning signal lines by time division.

The operations of the circuit having the foregoing structure will be explained in reference to the timing chart of FIG. 8.

To the data signal line SLm, supplied in time series are video signals DATAm for three pixels R, G and B from the driver IC. By the scanning pulses as sequentially outputted from the shift registers SR1, SR2, SR3, ..., SRn which constitute the common scanning signal line driving circuit 32a for R, G and B, the output signal lines GL1, GL2, GL3, ..., GLn are sequentially selected. The scanning pulses are then inputted to respective input terminals of the AND gates ANDnR, ANDnG, and ANDnB connected to the output signal line GLn as selected.

The time division switch control signals Rct1, Gct1, Bct1 as externally applied are supplied as pulse signals at intervals of not less than 1 pulse to every two time division switch control signal lines Rct1, Gct1, and Bct1.

As shown in FIG. 8, in the case where the pulse of the time division switch control signal Rct1 is in the High level in the period from Trs to Tre, the pulse of the time division switch control signal Gct1 is delayed from the time division switch control signal Rct1 by the time (Tgs-Trs), and the pulse of the time division switch control signal Bct1 is delayed from the time division switch control signal Gct1 by the time (Tbs-Tgs). The pulse width of each of the time division switch control signals Rct1, Gct1, Bct1 are Tre-Trs, Tge-Tgs and Tbe-Tbs respectively which are all equal.

The AND gate ANDnR performs a logical operation of a logical AND of a scanning pulse and a time division control signal Rct1 (control signal for display in R), the AND gate ANDnG performs a logical operation of a logical AND of a scanning pulse and a time division control signal Gct1 for display in G, and the AND gate ANDnB performs a logical operation of a logical AND of the scanning pulse and the time division control signal Bct1 for a control signal for display in B. As shown in FIG. 8, the scanning pulse is supplied to the corresponding one of the three scanning signal lines GLnR, GLnG and GLnB by dividing one horizontal scanning period into three time segments.

When the selection period of the scanning signal line GLnR starts at Trs, an operation of writing image data (video signal DATAmR) in the pixel PR (n, m) starts. This operation of writing the image data into the pixel PR (n, m) is stopped at Tre, i.e., the end of the selection period of the scanning signal line GLnR. Similarly, when the selection period of the scanning signal line GLnG starts at Tgs, an operation of writing image data (video signal DATAmG) in the pixel PG (n, m) starts. Here, the scanning signal line GLnR is set in the non-selection period, and thus the potential of the pixel PR (n, m) does not fluctuate by the operation of writing the image data into the pixel PG (n, m). Furthermore, the time division switch is not provided in the data signal line SLm, and it is therefore possible to prevent the problem associated with the conventional structure, i.e., the operation of writing the video signal into the adjacent data signal line is carried out in the state where an output of the time-division switch becomes high impedance, and the data signal line is in the floating state. With the foregoing structure of the present embodiment, the data signal line SLm is not affected by fluctuations in potential of the adjacent data signal lines SLm−1 and SLm+1, and the potential of the pixel PR (n, m) does not fluctuate by the writing operation of the video signals to the adjacent data signal lines SLm−1 and SLm+1.

The foregoing operation of writing the image data into the pixel PG (n, m) is stopped at Tge, i.e., the end of the selection period of the scanning signal line GLnG. Similarly, when the selection period of the scanning signal line GLnB starts at Tbs, an operation of writing image data (video signal DATAmB) in the pixel PB (n, m) starts. Here, the scanning signal lines GLnR and GLnG are in the non-selection period, and the potentials of the pixel PR (n, m), PG(n, m) do not fluctuate by the operation of writing the image data into the pixel PB (n, m). Furthermore, the time division switch is not provided in the data signal line SLm, and it is therefore possible to prevent the problem associated with the conventional structure, i.e., the operation of writing the video signal into the adjacent data signal line is carried out in the state where an output of the time-division switch becomes high impedance, and the data signal line is in the floating state. With the foregoing structure of the present embodiment, the data signal line SLm is not affected by fluctuations in potential of the adjacent data signal lines SLm−1 and SLm+1, and the potential of the pixel PR (n, m) and the potential of the pixel PG (n, m) do not fluctuate by the writing operation of the video signals to the adjacent data signal lines SLm−1 and SLm+1.

As explained, according to the image display apparatus in accordance with the present embodiment, the same effect as achieved from the image display apparatuses in accordance with the first through third embodiments can be achieved. That is, as the time-division switch is not provided in the data signal line SLm, it is possible to prevent the problem associated with the conventional structure, i.e., the operation of writing the video signal into the adjacent data signal line is carried out in the state where an output of the time-division switch becomes high impedance, and the data signal line is in the floating state. Therefore, the potential of the video signal already written does not fluctuate as being affected by the potential fluctuations of the adjacent data signal lines resulting from the supply of other video signals in adjacent pixels in the pixel block. Moreover, when scanning signal lines are sequentially selected by the scanning signal line driving circuit 32, the switching element SW of the pixel is switched OFF when the scanning signal line is in the non-selection state. Namely, since the scanning signal lines for selecting respective pixels in the pixel block are mutually different, within the block, when writing a video signal in a prescribed pixel, other pixels which receive other video signals can be set in the non-selection period.

As a result, the image data written in a pixel can be prevented from being affected by fluctuations in potential of adjacent scanning signal lines GLn−1, GLn+1, data signal lines SLm−1, SLm+1, and pixels.

According to the image display apparatus in accordance with the present embodiment wherein image data is divided into blocks, each being made up of a combination of a plurality of video signals for R, G and B, and respective video signals for each block are supplied to pixels by time division, a video signal written in a prescribed pixel can be prevented from being affected by fluctuations in potential due to a supply of another video signal to an adjacent pixel.

As described, the image display apparatus in accordance with the present embodiment, it is not necessary to provide a data signal line for each of the pixels in the pixel block, it is therefore possible to reduce the number of connection terminals.

In the image display apparatus in accordance with the present embodiment, the time division driving method is adopted for the scanning signal line driving circuit in the image display apparatuses in the first and second embodiments. The scanning signal line driving circuit 32 has the structure wherein scanning signal lines are divided into scanning signal line groups, each being made up of scanning signal line GLnR, GLnG and GLnB, and it is therefore possible to reduce the number of stages of the shift registers in each shift register group can be reduced to ⅓, that is 1 over the number of time segments, as compared to the case of connecting all the shift registers in series. Furthermore, when writing video signals in respective pixels in the block by time division, a scanning signal to be outputted to each of the scanning signal lines connected to the pixels in the same block by the time division circuit 32b is generated from an output signal of the corresponding shift register to compensate for a reduced number of shift registers in one shift register group.

According to the foregoing structure, since the number of stages of the shift registers of the scanning signal line driving circuit can be reduced, it is possible to reduce an area occupied by the circuit to ⅓, and to reduce the operation frequency of the scanning signal line driving circuit to ⅓ that is 1 over the number of time segments, as compared to the case of connecting all the shift registers in series as compared to the structure of the first or second embodiment, and it is therefore possible to reduce an amount of power consumption.

According to the image display apparatus in accordance with the present embodiment, for the time division circuit, the AND circuit is adopted in replace of the analog switch adopted in the image display apparatus in accordance with the third embodiment. With this structure, such problem that the scanning signal line becomes in the floating state while the analog switch is in the non-selection period, and thus the potential fixing means (for fixing the potential at Low level in the third embodiment) of the scanning signal line required in the period in which a pulse for setting ON the analog switch is not inputted can be omitted. With the foregoing AND circuit, it is possible to write the video signals by time division in the same block.

Incidentally, the number of time segments is set to three in the present embodiment, however, the present invention is not intended to be limited to the foregoing structure, and the number K of time segments can be set to any integer of not less than 2. In this case, the number of time segments is k in the above explanations.

Fifth Embodiment

Figure 9:
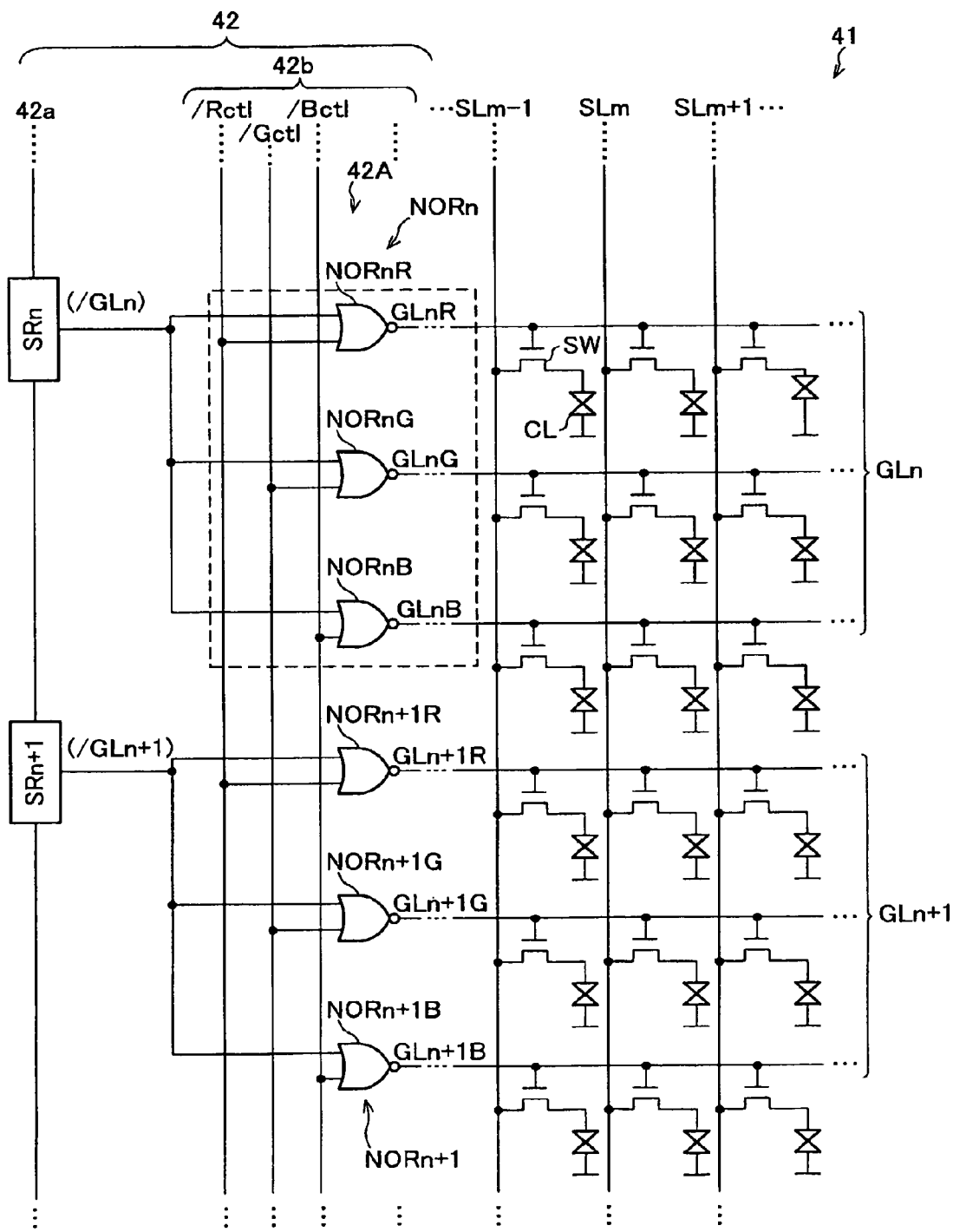
FIG. 9 is a typical depiction showing the structure of an active matrix substrate in accordance with the fifth embodiment of the present invention.
Figure 10:
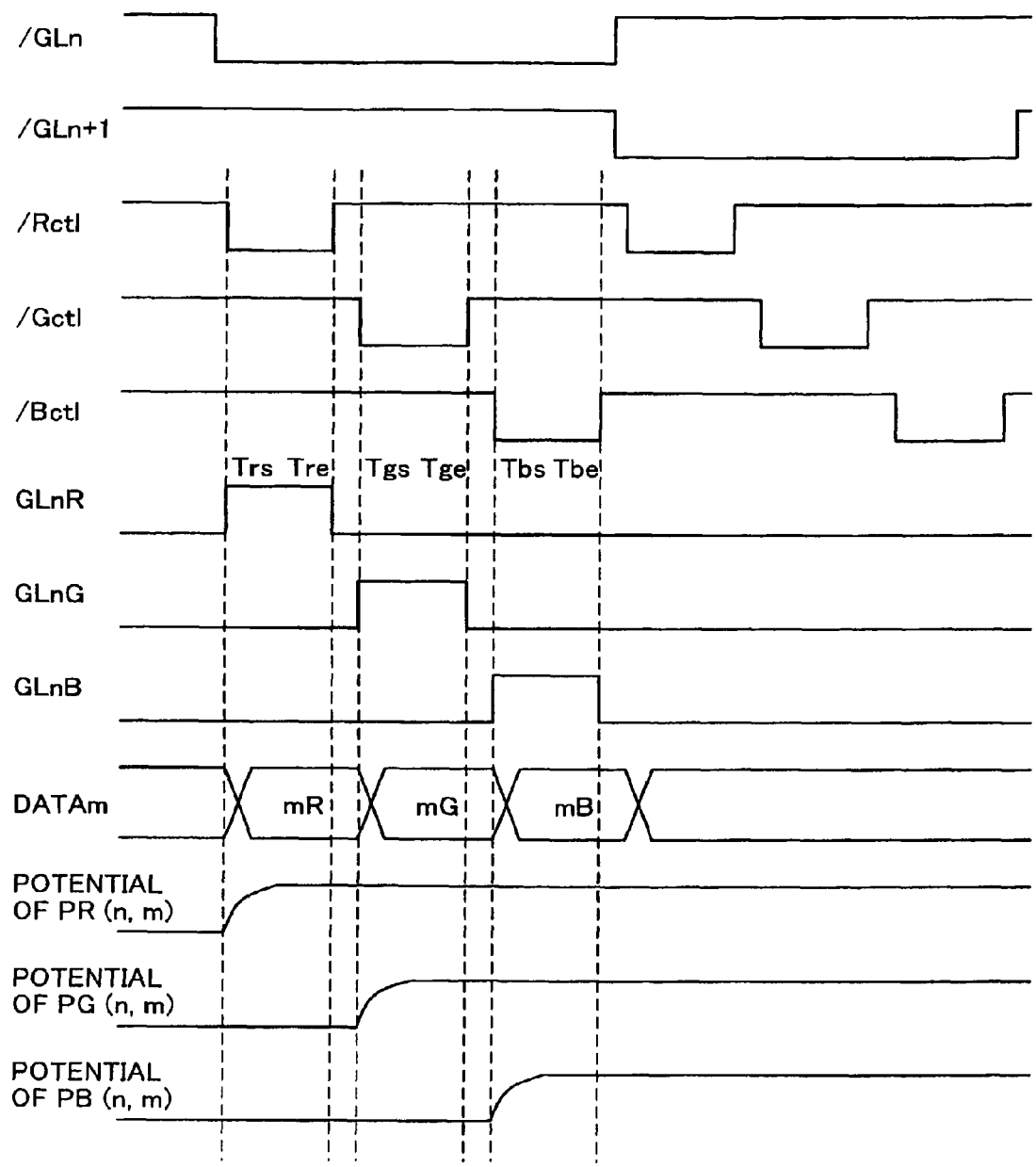
FIG. 10 is a timing chart showing operations of the active matrix substrate of FIG. 9.
Figure 11:
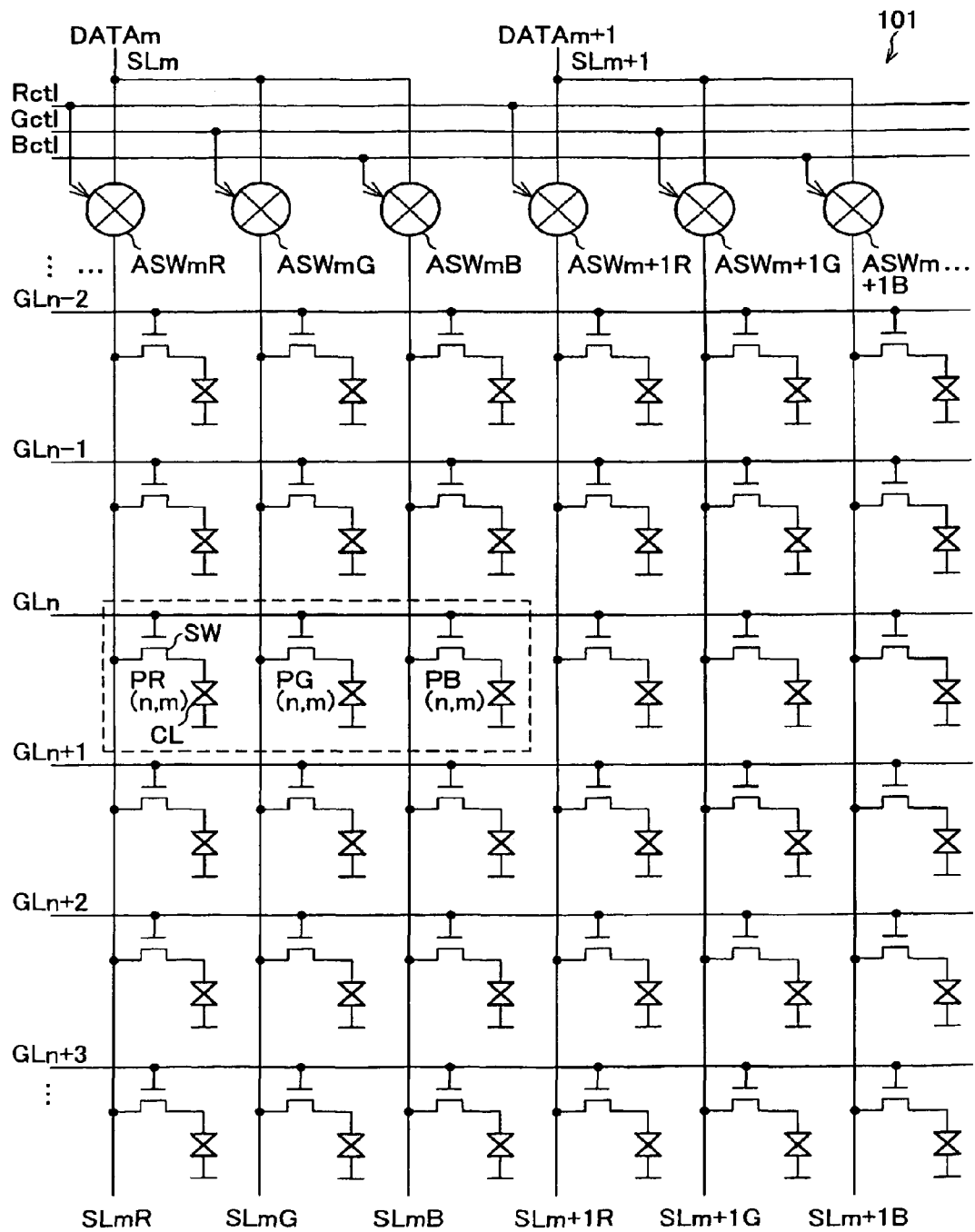
FIG. 11 is a typical depiction showing the structure of a conventional active matrix substrate.
Figure 12:
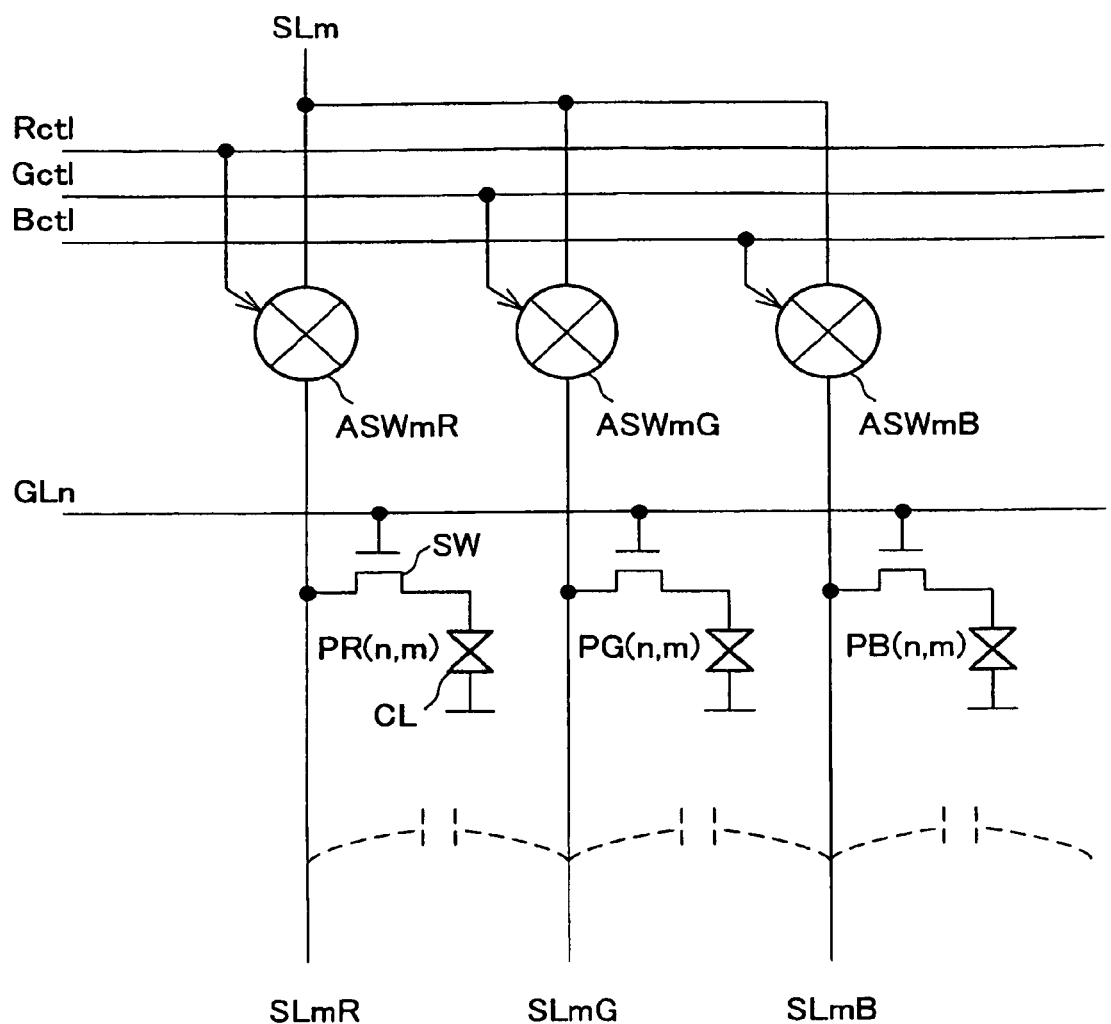
FIG. 12 is a typical depiction showing the structure for one pixel block of the active matrix substrate of FIG. 11.
Figure 13:
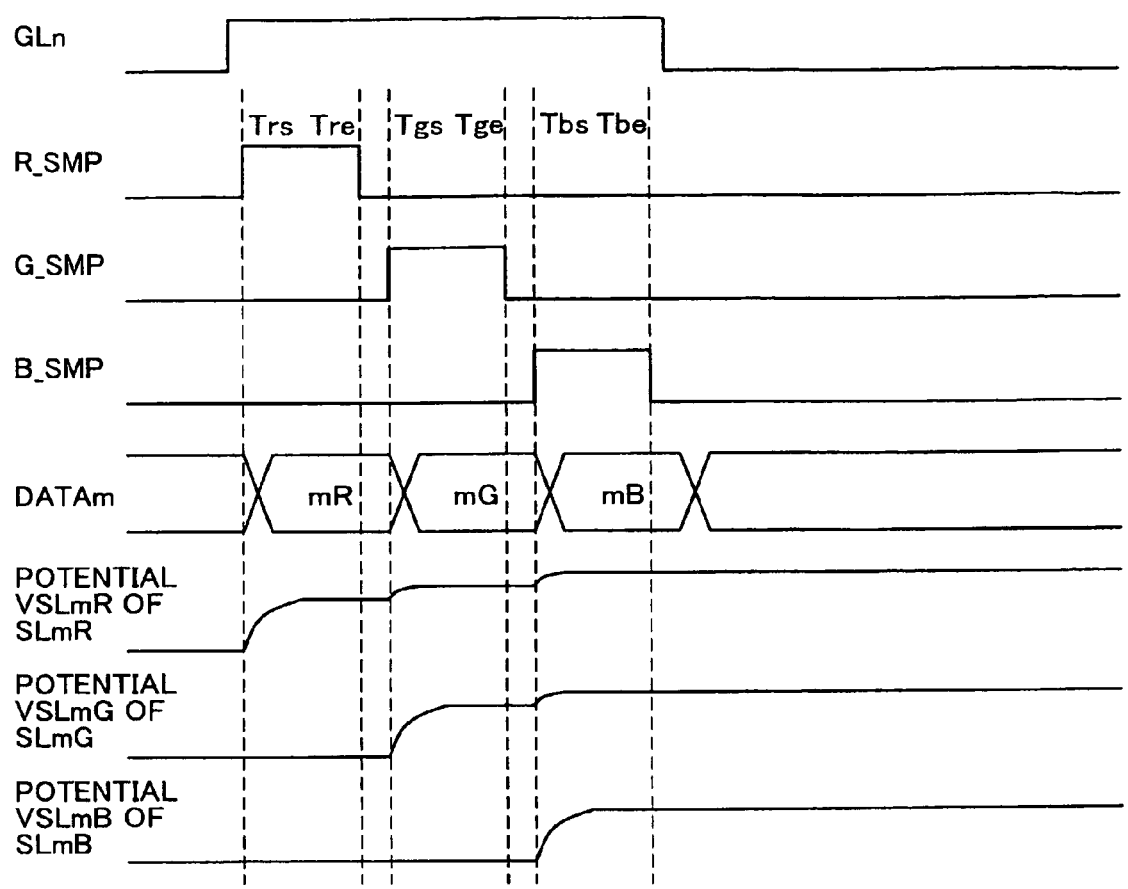
FIG. 13 is a timing chart showing operations of the active matrix substrate shown in FIG. 11 and FIG. 12.

The following descriptions will explain the fifth embodiment of the present invention with reference to FIGS. 9 and 10.

FIG. 9 is a typical depiction showing the structure of an active matrix substrate 41 of the image display apparatus in accordance with the first through fourth embodiments of the present invention. As in the first and second embodiments, the image display apparatus in accordance with the present embodiment is also arranged so that each pixel group is made up of pixels for respective colors of R(Red), G(Green) and B(Blue) to realize a color display.

As illustrated in FIG. 9, on this active matrix substrate 41, formed are a plurality of scanning signal lines GL1, GL2, GL3, . . . , GLn, . . . , and a plurality of data signal lines SL1, SL2, SL3, . . . , SLm which are arranged in a matrix form, and a plurality of pixels provided at respective intersections between the scanning signal lines and the data signal lines. The structure of the pixel and the driver IC of the data signal lines are the same as those of the first embodiment.

The image display apparatus in accordance with the present embodiment differs from the image display apparatus of the first embodiment in that the scanning signal line driving circuit 42 which is provided with a common scanning signal line driving circuit 42a for R, G and B, and a time division circuit 42b is adopted.

The common scanning signal line driving circuit 42a for R, G and B is made up of shift registers SR1, SR2, SR3, . . . , SRn which are used in common among respective pixels for R, G and B. Specifically, one shift register SRn is provided correspondingly to a group of the scanning signal lines GLnR, GLnG and GLnB connected to the pixels in each pixel block. All of these shift registers are connected in series from the beginning side to the end side in the scanning direction. From the shift register SRn, one output signal line GLn (for convenience in explanations, the same reference numeral as the scanning signal line /GLn is used) is brought out, which is branched into the scanning signal lines GLnR, GLnG and GLnB. The shift register SRn outputs to the output signal line /GLn, the scanning pulse which is reversed in logic from those of the third or fourth embodiment.

The time division circuit 42b includes a NOR circuit 42N, time division control signal lines /Rct1, /Gct1, and /Bct1. The NOR circuit 42N is made up of NOR gates NOR1, NOR2, NOR3, . . . , NORn. The NOR gate NORn is made up of NOR gates NORnR, NORnG and NORnB provided respectively for the scanning signal lines.

The NOR gate NORn are two-input NOR gates of the structure of CMOS, NMOS or PMOS, and are provided between the output signal line /GLn of the shift register SRn and the three scanning signal lines GLnR, GLnG and GLnB for R, G and B. Namely, the respective input terminals on one side of the NOR gates NORnR NORnG and NORnB are connected in common to the output signal line /GLn of the shift register SRn. The input terminal on the other side of the NOR gates NORnR is connected to the time division control signal line /Rct1, the input terminal of the NOR gate NORnG on the other side is connected to the time division control signal line /Gct1, and the input terminal of the NOR gate NORnB on the other side is connected to the time division control signal line /Bct1. The output terminal of the NOR gate NORnR is connected to one end of the scanning signal line GLnR, and the output terminal of the NOR gate NORnG is connected to one terminal of the scanning signal line GLnG, and the output terminal of the NOR gate NORnB is connected to one end of the scanning signal line GLnB.

The time division control signal lines /Rct1, /Gct1 and /Bct1 are lines separately provided from the signal supply line for video signals, for supplying time division control signals (scanning signal generation control signals) /Rct1, /Gct1, /Bct1 (for convenience in explanations, the same reference symbols are used as the time division control signal lines) for controlling the selection of image data among R, G and B. These time division control signal lines /Rct1, /Gct1, and /Bct1 are provided along the data signal line SLm. The time division control signal line /Rct1 is used in common among all the NOR gates for R, the time division control signal line /Gct1 is used in common among all the NOR gates for G, and the time division control signal line /Bct1 is used in common among all the NOR gates for B.

According to the image display apparatus in accordance with the present embodiment, scanning signal lines are divided into scanning signal line groups, each being made up of scanning signal line GLnR, GLnG and GLnB for R, G and B, and output signals to be applied to these scanning signal line GLnR, GLnG and GLnB in the group by time division. With this structure, the scanning signal line driving circuit 42 can drive the scanning signal lines by time division. In FIG. 9, the connection structure in the case of the time division driving in which a transmission time is divided into three time segments corresponding to R, G and B.

The operations of the circuit having the foregoing structure will be explained in reference to the timing chart of FIG. 10.

To the data signal line SLm, supplied in time series are video signals DATAm for three pixels R, G and B from the driver IC. By the scanning pulses as sequentially outputted from the shift registers SR1, SR2, SR3, SRn which constitute the common scanning signal line driving circuit 42a for R, G and B, the output signal lines /GL1, /GL2, /GL3, . . . , /GLn are sequentially selected. The scanning pulses are then inputted to respective input terminals of the NOR gates NORnR, NORnG, and NORnB connected to the output signal line /GLn as selected.

The time division switch control signals /Rct1, /Gct1, /Bct1 as externally applied are supplied as pulse signals at intervals of not less than 1 pulse to every two time division switch control signal lines /Rct1, /Gct1, and /Bct1. As shown in FIG. 10 in the case where the pulse of the time division switch control signal /Rct1 is in the Low level in the period from Trs to Tre, the pulse of the time division switch control signal /Gct1 is delayed from the time division switch control signal /Rct1 by the time (Tgs-Trs), and the pulse of the time division switch control signal /Bct1 is delayed from the time division switch control signal /Gct1 by the time (Tbs-Tgs). The pulse width of each of the time division switch control signals /Rct1, /Gct1, /Bct1 are Tre-Trs, Tge-Tgs and Tbe-Tbs respectively which are all equal.

The NOR gate NORnR performs a logical operation of a logical NOR of a reversed signal of a scanning pulse /GLn and a time division control signal /Rct1 (control signal for display in R), the NOR gate NORnG performs a logical operation of a logical NOR of a reversed signal of a scanning pulse /GLn and a time division control signal /Gct1 for display in G, and the NOR gate NORnB performs a logical operation of a logical NOR of a reversed signal of a scanning pulse /GLn and the time division control signal /Bct1 for a control signal for display in B. As shown in FIG. 10, the scanning pulse is supplied to the corresponding one of the three scanning signal lines GLnR, GLnG and GLnB by dividing one horizontal scanning period into three time segments.

When the selection period of the scanning signal line GLnR starts at Trs, an operation of writing image data (video signal DATAmR) in the pixel PR (n, m) starts. This operation of writing the image data into the pixel PR (n, m) is stopped at Tre, i.e., the end of the selection period of the scanning signal line GLnR. Similarly, when the selection period of the scanning signal line GLnG starts at Tgs, an operation of writing image data (video signal DATAmG) in the pixel PG (n, m) starts. Here, the scanning signal line GLnR is set in the non-selection period, and the potential of the pixel PR (n, m) does not fluctuate by the operation of writing the image data into the pixel PG (n, m). Furthermore, the time division switch is not provided in the data signal line SLm, and it is therefore possible to prevent the problem associated with the conventional structure, i.e., the operation of writing the video signal into the adjacent data signal line is carried out in the state where an output of the time-division switch becomes high impedance, and the data signal line is in the floating state. With the foregoing structure of the present embodiment, the data signal line SLm is not affected by fluctuations in potential of the adjacent data signal lines SLm−1 and SLm+1, and the potential of the pixel PR (n, m) does not fluctuate by the writing operation of the video signals to the adjacent data signal lines SLm−1 and SLm+1.

The foregoing operation of writing the image data into the pixel PG (n, m) is stopped at Tge, i.e., the end of the selection period of the scanning signal line GLnG. Similarly, when the selection period of the scanning signal line GLnB starts at Tbs, an operation of writing image data (video signal DATAmB) in the pixel PB (n, m) starts. Here, the scanning signal lines GLnR and GLnG are in the non-selection period, and the potentials of the pixel PR (n, m), PG(n, m) do not fluctuate by the operation of writing the image data into the pixel PB (n, m). Furthermore, the time division switch is not provided in the data signal line SLm, and it is therefore possible to prevent the problem associated with the conventional structure, i.e., the operation of writing the video signal into the adjacent data signal line is carried out in the state where an output of the time-division switch becomes high impedance, and the data signal line is in the floating state. With the foregoing structure of the present embodiment, the data signal line SLm is not affected by fluctuations in potential of the adjacent data signal lines SLm−1 and SLm+1, and the potential of the pixel PR (n, m) and the potential of the pixel PG (n, m) do not fluctuate by the writing operation of the video signals to the adjacent data signal lines SLm−1 and SLm+1.

As explained, according to the image display apparatus in accordance with the present embodiment, the same effect as achieved from the image display apparatuses in accordance with the first through third embodiments can be achieved. That is, as the time-division switch is not provided in the data signal line SLm, it is possible to prevent the problem associated with the conventional structure, i.e., the operation of writing the video signal into the adjacent data signal line is carried out in the state where an output of the time-division switch becomes high impedance, and the data signal line is in the floating state. Therefore, the potential of the video signal already written does not fluctuate as being affected by the potential fluctuations of the adjacent data signal lines resulting from the supply of other video signals in adjacent pixels in the pixel block. Moreover, when scanning signal lines are sequentially selected by the scanning signal line driving circuit 12, the switching element SW of the pixel is switched OFF when the scanning signal line is in the non-selection state. Namely, since the scanning signal lines for selecting respective pixels in the pixel block are mutually different, within the block, when writing a video signal in a prescribed pixel, other pixels which receive other video signals can be set in the non-selection period.

As a result, the image data written in a pixel can be prevented from being affected by fluctuations in potential of adjacent scanning signal lines GLn−1, GLn+1, data signal lines SLm−1, SLm+1, and pixels.

According to the image display apparatus in accordance with the present embodiment wherein image data is divided into blocks, each being made up of a combination of a plurality of video signals for R, G and B, and respective video signals for each block are supplied to pixels by time division, a video signal written in a prescribed pixel can be prevented from being affected by fluctuations in potential due to a supply of another video signal to an adjacent pixel.

As described, the image display apparatus in accordance with the present embodiment, it is not necessary to provide a data signal line for each of the pixels in the pixel block, it is therefore possible to reduce the number of connection terminals.

In the image display apparatus in accordance with the present embodiment, the time division driving method is adopted for the scanning signal line driving circuit in the image display apparatuses in the first and second embodiments. The scanning signal line driving circuit 32 has the structure wherein scanning signal lines are divided into scanning signal line groups, each being made up of scanning signal line GLnR, GLnG and GLnB, and it is therefore possible to reduce the number of stages of the shift registers in each shift register group can be reduced to ⅓, that is 1 over the number of time segments, as compared to the case of connecting all the shift registers in series. Furthermore, when writing video signals in respective pixels in the block by time division, a scanning signal to be outputted to each of the scanning signal lines connected to the pixels in the same block is generated from an output signal of the corresponding shift register to compensate for a reduced number of shift registers in one shift register group.

According to the foregoing structure, since the number of stages of the shift registers of the scanning signal line driving circuit can be reduced, it is possible to reduce an area occupied by the circuit to ⅓, and to reduce the operation frequency of the scanning signal line driving circuit to ⅓ that is 1 over the number of time segments, as compared to the case of connecting all the shift registers in series as compared to the structure of the first or second embodiment, and it is therefore possible to reduce an amount of power consumption.

According to the image display apparatus in accordance with the present embodiment, for the time division circuit, the NOR circuit is adopted in replace of the analog switch adopted in the image display apparatus in accordance with the third embodiment. With this structure, such problem that the scanning signal line becomes in the floating state while the analog switch is in the non-selection period, and thus the potential fixing means (for fixing the potential at Low level in the third embodiment) of the scanning signal line required in the period in which a pulse for setting ON the analog switch is not inputted can be omitted. With the foregoing NOR circuit, it is possible to write the video signals by time division in the same block.

Incidentally, the number of time segments is set to three in the present embodiment, however, the present invention is not intended to be limited to the foregoing structure, and the number K of time segments can be set to any integer of not less than 2. In this case, the number of time segments is k in the above explanations.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

As described, the image display apparatus of the present invention is characterized by including:

a plurality of scanning signal lines and a plurality of data signal lines which are arranged in a matrix form;

a plurality of pixels provided correspondingly to respective intersections between the plurality of scanning signal lines and the plurality of data signal lines, wherein the plurality of pixels are divided into pixel blocks, each pixel block being made up of pixels corresponding to a set of video signals to be supplied thereto by time-division; and a scanning signal line driving circuit which sequentially outputs a scanning signal for selecting a pixel, to each of the plurality of scanning signal lines, wherein a display is performed by a) outputting by time-division the video signals to be supplied to the pixels in each pixel block, to a data signal line, and b) writing a video signal in each pixel as selected by the scanning signal line driving circuit via a corresponding scanning signal line; and the pixels which constitute one pixel block are sequentially selected by time division via corresponding different scanning signal lines, and the video signal is then written in each pixel by a common data signal line. According to the foregoing structure, respective pixels in the pixel block are sequentially selected by time division via corresponding different scanning signal lines. Then, video signals are written in respective pixels by time division from a data signal line used in common among the pixels in the pixel block.

With this structure, it is not necessary to write video signals in the pixels in the pixel block via respective data signal lines, and it is therefore possible to omit time division switches for supplying the video signals by time division. As a result, it is possible to prevent the problem associated with the conventional structure, i.e., the operation of writing the video signal into the adjacent data signal line is carried out in the state where an output of the time-division switch becomes high impedance, and the data signal line is in the floating state. Therefore, the potential of the video signal already written does not fluctuate as being affected by the potential fluctuations of the adjacent data signal line resulting from the supply of another video signal into an adjacent pixel in the pixel block. Incidentally, as the scanning signal lines for selecting respective pixels which constitute one pixel block are mutually different, when writing a video signal in one pixel, other pixels to which other video signals are to be written can be set in the non-selection state.

As a result, the video signal written in one pixel can be prevented from being affected by potential fluctuations of the adjacent scanning signal lines, data signal lines and pixels.

As a result, it is possible to realize an image display apparatus wherein image data is divided into blocks, each being made up of a combination of a plurality of video signals, and respective video signals for each block are supplied to pixels by time division, which permits a video signal written in a prescribed pixel from being affected by fluctuations in potential due to a supply of another video signal to an adjacent pixel.

With the foregoing structure, it is not necessary to provide a data signal line for each of the pixels in the pixel block, and it is therefore possible to reduce the number of connection terminals.

The image display apparatus of the present invention of the foregoing structure may be arranged such that: the scanning signal line driving circuit includes a plurality of shift registers provided for respective scanning signal lines, which are connected in series; and respective output signals of the plurality of shift registers are used as the scanning signals.

According to the foregoing structure, only by increasing the number of stages of shift registers in the scanning signal line driving circuit, by a number of time segments for supplying video signals to the pixels in the pixel block from that of the conventional shift registers, it is possible to output scanning signals by time division without such problem that the video signal written in the pixel is affected by pixel fluctuations due to a supply of another video signal into an adjacent pixel.

The image display apparatus having the foregoing structure may be further arranged such that:

the scanning signal line driving circuit includes shift register groups provided in a number of k, k indicating a number of time segments in a transmission time of the time division for supplying the video signals to the pixels in each pixel block, wherein, of all the shift registers provided for respective scanning signal lines, those which correspond to the scanning signal lines connected to the pixels to which the video signals are supplied in the i-th order ($1 \leq i \leq k$) are mutually connected in series; and a scanning signal to be outputted to each of the scanning signal lines connected to the pixels in the i-th line is generated by performing a logical operation to obtain a logical AND of a) an output signal from one of the shift registers in the i-th shift register group, b) an inversed signal of the output signal from the shift register in the i+1-th shift register group (the first shift register group in the case of i=k), and c) a scanning signal generation control signal supplied by a separately provided signal supply line.

According to the foregoing structure wherein the shift register groups are provided in the number of k, the number of stages of the shift registers in each shift register group can be reduced to 1/k as compared to the case of connecting all the shift registers in series. Furthermore, when writing video signals in respective pixels in the block by time division, a scanning signal to be outputted to each of the scanning signal lines connected to the pixels in the i-th shift register group is generated by performing a logical operation to obtain a logical AND of a) an output signal from one of the shift registers in the i-th shift register group, b) an inversed signal of the output signal from the shift register in the i+1-th shift register group (the first shift register group in the case of i=k), and c) a scanning signal generation control signal supplied by a separately provided signal supply line, to compensate for a reduced number of shift registers in one shift register group.

As a result, an operation frequency of the scanning signal line driving circuit can be reduced to 1/k, that is 1 over the number of time segments, as compared to the case of connecting all the shift registers in series, and it is therefore possible to reduce an amount of power consumption.

The image display apparatus having the foregoing structure may be further arranged such that:

the scanning signal line driving circuit includes a plurality of shift registers connected in series, each shift register being provided correspondingly to a group of the scanning signal lines connected to the pixels in each pixel block, the image display apparatus, further comprising:

a time-division circuit which generates from the output signal of the corresponding shift register, the scanning signal to be outputted to each of the scanning signal lines connected to the pixels in each pixel block.

According to the foregoing structure wherein a shift register is provided correspondingly to a group of the scanning signal lines connected to the pixels in each pixel block, the number of stages of the shift registers in each shift register group can be reduced to 1/k, that is 1 over the number of time segments, as compared to the case of connecting all the shift registers in series. Furthermore, when writing video signals in pixels in the block by time division, a scanning signal to be outputted to each of the scanning signal lines connected to the pixels in the block is generated from the output signal of the corresponding shift register, to compensate for a reduced number of shift registers.

With the above structure, since the number of stages of the shift registers of the scanning signal line driving circuit can be reduced, it is possible to reduce an area occupied by the circuit, and the operation frequency of the scanning signal line driving circuit can be reduced to 1/k that is 1 over the number of time segments, as compared to the case of connecting all the shift registers in series, and it is therefore possible to reduce an amount of power consumption.

The image display apparatus having the foregoing structure of the present invention may be further arranged such that:

the time division circuit includes a) a plurality of analog switches wherein each analog switch is provided for connecting an output signal line of the shift register and each of the scanning signal lines for one pixel block, and b) potential fixing means for fixing a potential of the scanning signal line connected thereto when the analog switch is in the non-conductive state.

According to the foregoing structure, an output signal line of the shift register and each scanning signal line can be conducted by time division by an analog switch. Further, by the potential fixing means, the potential of the scanning signal line connected the analog switch is fixed when the analog switch is in the non-conductive state. As a result, it is possible to prevent the problem of carrying out a writing operation of a video signal in the floating state of the scanning signal line.

As a result, video signals can be surely written in respective pixels in the pixel block by time division.

The image display apparatus having the foregoing structure of the present invention may be further arranged such that:

the time division circuit includes a two-input AND circuit provided for each scanning signal line, wherein a) an output of the shift register is inputted to one of the input terminals of the two-input AND circuit, b) a scanning signal generation control signal is inputted to the other input terminal of the two-input AND circuit from a separately provided signal supply line, and c) an output terminal of the two-input AND circuit is connected to the scanning signal line.

According to the foregoing structure, by performing a logical operation by the AND circuit to obtain a logical AND of the output signal of the shift register and the scanning signal generation control signal, it is possible to supply respective video signals by time division to the scanning signal lines respectively connected to the signal output line of the shift register.

As a result, video signals can be surely written in respective pixels in the pixel block by time division.

Furthermore, the potential of the scanning signal line is defined by the potential of the output terminal of the AND circuit, and it is therefore possible to omit the means for fixing the potential of the scanning signal line when the scanning signal line is set in the non-selection state.

The image display apparatus having the foregoing structure may be further arranged such that:

the time division circuit includes a two-input NOR circuit provided for each scanning signal line, wherein a) an inversed signal of an output of the shift register is inputted to one of the input terminals of the two-input NOR circuit, b) a scanning signal generation control signal is inputted to the other input terminal of the two-input NOR circuit from a separately provided signal supply line, and c) an output terminal of the two-input NOR circuit is connected to the scanning signal line.

According to the foregoing structure, by performing a logical operation by the NOR circuit to obtain a logical NOR of an inversed signal of the output signal of the shift register and the scanning signal generation control signal, it is possible to supply respective video signals by time division to the scanning signal lines respectively connected to the signal output line of the shift register.

As a result, video signals can be surely written in respective pixels in the pixel block by time division.

Furthermore, the potential of the scanning signal line is defined by the potential of the output terminal of the NOR circuit, and it is therefore possible to omit the means for fixing the potential of the scanning signal line when the scanning signal line is set in the non-selection state.

Another image display apparatus in accordance with the present invention is characterized by including:

a plurality of scanning signal lines and a plurality of data signal lines which are arranged in a matrix form;

a plurality of pixels provided correspondingly to respective intersections between the plurality of scanning signal lines and the plurality of data signal lines, wherein the plurality of pixels are divided into pixel blocks, each pixel block being made up of three pixels corresponding to a set of video signals for R, G and B to be supplied thereto by time-division; and a scanning signal line driving circuit which sequentially outputs a scanning signal for selecting a pixel, to each of the plurality of scanning signal lines, wherein a display is performed by a) outputting by time-division the video signals to be supplied to the pixels in each pixel block, to a data signal line, and b) writing a video signal in each pixel as selected by the scanning signal line driving circuit via a corresponding scanning signal line; and the pixels which constitute one pixel block are sequentially selected by time division via mutually different scanning signal lines, and the video signal is then written in each pixel by a common data signal line. According to the foregoing structure, respective pixels for R, G and B in the pixel block are sequentially selected by the time division method in which a transmission time is divided into three time segments, via different scanning signal lines. Then, video signals are written in the pixels by time division from a data signal line used in common among the pixels in the pixel block.

With this structure, it is not necessary to write video signals in the pixels in the pixel block via respective data signal lines, and it is therefore possible to omit a time division switch for supplying the video signals by time division. As a result, it is possible to prevent the problem associated with the conventional structure, i.e., the operation of writing the video signal into the adjacent data signal line is carried out in the state where an output of the time-division switch becomes high impedance, and the data signal line is in the floating state. Therefore, the potential of the video signal already written does not fluctuate by the potential fluctuations of the adjacent data signal lines resulting from the supply of other video signals in adjacent pixels in the pixel block. Incidentally, as the scanning signal lines for selecting respective pixels which constitute one pixel block are mutually different, when writing a video signal in one pixel, other pixels to which other video signals are to be written can be set in the non-selection state.

As a result, the video signal written in one pixel can be prevented from being affected by potential fluctuations of the adjacent scanning signal lines, data signal lines and pixels.

As a result, it is possible to realize an image display apparatus wherein image data is divided into blocks, each being made up of a combination of a plurality of video signals for R, G and B, and respective video signals for each block are supplied to pixels by time division, which permits a video signal written in a prescribed pixel from being affected by fluctuations in potential due to a supply of another video signal to an adjacent pixel.

Incidentally, it is not necessary to provide a data signal line for each of the pixels for R, G and B in the pixel block, it is possible to reduce the number of connection terminals.

The image display apparatus having the foregoing structure may be further arranged such that:

the scanning signal line driving circuit includes a plurality of shift registers provided for respective scanning signal lines, which are connected in series; and respective output signals of the plurality of shift registers are used as the scanning signals.

According to the foregoing structure, only by increasing the number of stages of shift registers in the scanning signal line driving circuit, by three, i.e., the number of time segments for supplying video signals to the pixels in the pixel block, from that of the conventional shift registers, it is possible to output scanning signals by time division without such problem that the video signal written in the pixel is affected by pixel fluctuations due to a supply of a video signal into an adjacent pixel.

The image display apparatus having the foregoing structure, wherein:

the scanning signal line driving circuit includes three shift register groups wherein, of all the shift registers provided for respective scanning signal lines, those which correspond to the scanning signal lines connected to pixels to which the video signals are supplied in the i-th order ($1 \leq i \leq 3$) are mutually connected in series; and a scanning signal to be outputted to each of the scanning signal lines connected to the pixels in the i-th shift register group is generated by performing a logical operation to obtain a logical AND of a) an output signal from one of the shift registers in the i-th shift register group, b) an inversed signal of the output signal from the shift register in the i+1-th shift register group (the first shift register group in the case of i=3), and c) a scanning signal generation control signal supplied by a separately provided signal supply line.

According to the foregoing structure wherein three shift register groups are provided, the number of stages of the shift registers in each shift register group can be reduced to ⅓ as compared to the case of connecting all the shift registers in series. Furthermore, when writing video signals in pixels in the block by time division, a scanning signal to be outputted to each of the scanning signal lines connected to the pixels in the i-th shift register group is generated by performing a logical operation to obtain a logical AND of a) an output signal from one of the shift registers in the i-th shift register group, b) an inversed signal of the output signal from the shift register in the i+1-th shift register group (the first shift register group in the case of i=3), and c) a scanning signal generation control signal supplied by a separately provided signal supply line, to compensate for a reduced number of shift registers in one shift register group.

As a result, an operation frequency of the scanning signal line driving circuit can be reduced to ⅓ that is 1 over the number of time segments, as compared to the case of connecting all the shift registers in series, and it is therefore possible to reduce an amount of power consumption.

The image display apparatus having the foregoing structure may be further arranged such that:

the scanning signal line driving circuit includes a plurality of shift registers connected in series, each shift register being provided correspondingly to a group of the scanning signal lines connected to the pixels in each pixel block, the image display apparatus, further comprising:

a time-division circuit which generates from the output signal of the corresponding shift register, the scanning signal to be outputted to each of the scanning signal lines connected to the pixels in each pixel block.

According to the foregoing structure wherein a shift register is provided correspondingly to a group of the scanning signal lines connected to the pixels in each pixel block, the number of stages of the shift registers in each shift register group can be reduced to ⅓ as compared to the case of connecting all the shift registers in series. Furthermore, when writing video signals in pixels in the block by time division, a scanning signal to be outputted to each of the scanning signal lines connected to the pixels in the block is generated from the output signal of the corresponding shift register, to compensate for a reduced number of shift registers in one shift register group.

According to the foregoing structure, since the number of stages of the shift registers of the scanning signal line driving circuit can be reduced, it is possible to reduce an area occupied by the circuit, and the operation frequency of the scanning signal line driving circuit can be reduced can be reduced to ⅓ that is 1 over the number of time segments, as compared to the case of connecting all the shift registers in series, and it is therefore possible to reduce an amount of power consumption.

The image display apparatus having the foregoing structure of the present invention is characterized in that:

the time division circuit includes a) a plurality of analog switches wherein each analog switch is provided for connecting an output signal line of the shift register and each of the scanning signal lines for one pixel block, and b) potential fixing means for fixing a potential of the scanning signal line connected thereto when the analog switch is in the non-conductive state.

According to the foregoing structure, an output signal line of the shift register and each scanning signal line can be conducted by time division by an analog switch. Further, by the potential fixing means, the potential of the scanning signal line connected the analog switch is fixed when the analog switch is in the non-conductive state. As a result, it is possible to prevent the problem of carrying out a writing operation of a video signal in the floating state of the scanning signal line.

As a result, video signals can be surely written in respective pixels in the pixel block by time division.

The image display apparatus having the foregoing structure of the present invention may be further arranged such that:

the time division circuit includes a two-input AND circuit provided for each scanning signal line, wherein a) an output of the shift register is inputted to one of the input terminals of the two-input AND circuit, b) a scanning signal generation control signal is inputted to the other input terminal of the two-input AND circuit from a separately provided signal supply line, and c) an output terminal of the two-input AND circuit is connected to the scanning signal line.

According to the foregoing structure, by performing a logical operation by the AND circuit to obtain a logical AND of the output signal of the shift register and the scanning signal generation control signal, it is possible to supply respective video signals by time division to the scanning signal lines respectively connected to the signal output line of the shift register.

As a result, video signals can be surely written in respective pixels in the pixel block by time division.

Furthermore, the potential of the scanning signal line is defined by the potential of the output terminal of the AND circuit, and it is therefore possible to omit the means for fixing the potential of the scanning signal line when the scanning signal line is set in the non-selection state.

The image display apparatus having the foregoing structure of the present invention is arranged such that:

the time division circuit includes a two-input NOR circuit provided for each scanning signal line, wherein a) an inversed signal of an output of the shift register is inputted to one of the input terminals of the two-input NOR circuit, b) a scanning signal generation control signal is inputted to the other input terminal of the two-input NOR circuit from a separately provided signal supply line, and c) an output terminal of the two-input NOR circuit is connected to the scanning signal line.

According to the foregoing structure, by performing a logical operation by the NOR circuit to obtain a logical NOR of an inversed signal of the output signal of the shift register and the scanning signal generation control signal, it is possible to supply respective video signals by time division to the scanning signal lines respectively connected to the signal output line of the shift register.

As a result, video signals can be surely written in respective pixels in the pixel block by time division.

Furthermore, the potential of the scanning signal line is defined by the potential of the output terminal of the NOR circuit, and it is therefore possible to omit the means for fixing the potential of the scanning signal line when the scanning signal line is set in the non-selection state.

As described, the image display apparatus in accordance with the present invention is arranged such that respective pixels which constitute one pixel block are sequentially selected by time division via corresponding different scanning signal lines, and the video signals are written from the common data signal line.

As a result, it is possible to realize an image display apparatus wherein image data is divided into blocks, each being made up of a combination of a plurality of video signals for R, G and B, which can prevent a video signal written in a prescribed pixel from being affected by fluctuations in potential due to a supply of another video signal to adjacent pixel when respective video signals of the block are supplied to pixels by time division.

The present invention can be suitably applied to liquid crystal display apparatuses, EL display apparatuses, etc.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image display apparatus, comprising:
a plurality of scanning signal lines and a plurality of data signal lines which are arranged in a matrix form;
a plurality of pixels provided correspondingly to respective intersections between said plurality of scanning signal lines and said plurality of data signal lines, wherein said plurality of pixels are divided into pixel blocks, each pixel block being made up of three pixels arranged along mutually different scanning lines and along a common data line, corresponding to a set of video signals for R, G and B to be supplied thereto by time-division;
a scanning signal line driving circuit to sequentially output a scanning signal for selecting a pixel, to each of said plurality of scanning signal lines, the pixels constituting one pixel block being sequentially selected via mutually different scanning signal lines, said scanning signal line driving circuit including a plurality of shift registers connected in series, each shift register being provided correspondingly to a group of the scanning signal lines connected to the pixels in each pixel block; and
a time-division circuit to generate from an output signal of at least one of the plurality of shift registers, the scanning signal to be outputted to each of the scanning signal lines connected to the pixels in each pixel block, wherein
said time division circuit includes a plurality of two-input AND circuits each provided for one scanning signal line, and a number of two-input AND circuits of the plurality of two-input AND circuits correspond to the pixel block, wherein a) an output signal of one of the plurality of shift registers is inputted to one of the input terminals of each two-input AND circuit, b) a scanning signal generation control signal is inputted to the other input terminal of said each two-input AND circuit from a separately provided signal supply line, and c) an output terminal of said each two-input AND circuit is connected to the scanning signal line.

2. The image display apparatus as set forth in claim 1, wherein display is performed by outputting by time-division the video signals to be supplied to the pixels in each pixel block, to a common data signal line, and writing a video signal in each pixel as sequentially selected by said scanning signal line driving circuit via corresponding mutually different scanning signal lines.

3. The image display apparatus of claim 1, wherein all of the plurality of shift registers of the scanning signal line driving circuit are connected in series along a scanning direction.

4. An image display apparatus, comprising:
a plurality of scanning signal lines and a plurality of data signal lines which are arranged in a matrix form;
a plurality of pixels provided correspondingly to respective intersections between said plurality of scanning signal lines and said plurality of data signal lines, wherein said plurality of pixels are divided into pixel blocks, each pixel block being made up of three pixels corresponding to a set of video signals for R, G and B arranged along mutually different scanning lines and along a common data line, to be supplied thereto by time-division;
a scanning signal line driving circuit to sequentially output a scanning signal for selecting a pixel, to each of said plurality of scanning signal lines, the pixels constituting one pixel block being sequentially selected by time division via mutually different scanning signal lines, wherein said scanning signal line driving circuit includes a plurality of shift registers connected in series, each shift register being provided correspondingly to a group of the scanning signal lines connected to the pixels in each pixel block; and
a time-division circuit to generate, from an output signal of at least one of the plurality of shift registers, the scanning signal to be outputted to each of the scanning signal lines connected to the pixels in each pixel block, wherein said time division circuit includes a two-input AND circuit provided for each scanning signal line, wherein a) an output signal of one of the plurality of shift registers is inputted to one of the input terminals of said two-input AND circuit, b) a scanning signal generation control signal is inputted to the other input terminal of said two-input AND circuit from a separately provided signal supply line, and c) an output terminal of said two-input AND circuit is connected to the scanning signal line.

5. The image display apparatus as set forth in claim 4, wherein display is performed by outputting by time-division the video signals to be supplied to the pixels in each pixel block, to a common data signal line, and writing a video signal in each pixel as sequentially selected by said scanning signal line driving circuit via corresponding mutually different scanning signal lines.

6. The image display apparatus of claim 4, wherein all of the plurality of shift registers of the scanning signal line driving circuit are connected in series along a scanning direction.

* * * * *